United States Patent
Yamashita et al.

(10) Patent No.: US 8,211,568 B2
(45) Date of Patent: Jul. 3, 2012

(54) PACKAGING MATERIAL FOR FLAT ELECTROCHEMICAL CELL

(75) Inventors: Takanori Yamashita, Tokyo (JP); Masataka Okushita, Tokyo (JP); Hirohisa Akita, Tokyo (JP); Hiroshi Hoya, Chiba (JP)

(73) Assignees: Dai Nippon Printing Co., Ltd., Shinjuku-ku, Tokyo (JP); Mitsui Chemicals, Inc., Minato-ku, Tokyo (JP)

( * ) Notice: Subject to any disclaimer, the term of this patent is extended or adjusted under 35 U.S.C. 154(b) by 945 days.

(21) Appl. No.: 12/078,269

(22) Filed: Mar. 28, 2008

(65) Prior Publication Data
US 2008/0241663 A1  Oct. 2, 2008

(30) Foreign Application Priority Data

Mar. 30, 2007 (JP) ................... 2007-091287
Mar. 25, 2008 (JP) ................... 2008-077049

(51) Int. Cl.
*H01M 6/00* (2006.01)
*H01M 10/00* (2006.01)
*H01M 2/00* (2006.01)
*H01M 2/02* (2006.01)
*H01M 2/04* (2006.01)

(52) U.S. Cl. .................... 429/176; 429/122; 429/163
(58) Field of Classification Search ............ 429/122, 429/162–165, 124, 127, 148–149, 151–154, 429/156, 159, 174–178, 180; 29/623.1–623.4
See application file for complete search history.

(56) References Cited

U.S. PATENT DOCUMENTS

| 4,311,742 A * | 1/1982 | Otsuka ................ 428/35.4 |
| 5,492,741 A * | 2/1996 | Akao et al. ............ 428/35.2 |
| 6,632,538 B1 * | 10/2003 | Yamazaki et al. ........ 428/461 |
| 2006/0093906 A1 * | 5/2006 | Yamashita et al. ....... 429/176 |

FOREIGN PATENT DOCUMENTS

| EP | 11608921 A1 | 12/2001 |
| EP | 1209094 A1 | 5/2002 |
| EP | 1315219 A1 | 5/2003 |
| JP | 2003127265 A * | 5/2003 |
| JP | 2005-056729 | 3/2005 |

* cited by examiner

*Primary Examiner* — Barbara Gilliam
*Assistant Examiner* — Claire L Roe
(74) *Attorney, Agent, or Firm* — Fitch, Even, Tabin & Flannery, LLP

(57) ABSTRACT

In a packaging material for electrochemical cell, a thermally adhesive resin layer is configured of a resin having a propylene based elastomer resin in a propylene based resin. This propylene based elastomer resin is a copolymer composed of a constitutional unit derived from propylene and a constitutional unit derived from an α-olefin having from 2 to 20 carbon atoms; when the total sum of the constitutional unit derived from propylene and the constitutional unit derived from an α-olefin is defined as 100% by mole, contains 50% by mole or more of the constitutional unit derived from propylene; and is satisfied with (a) a Shore A hardness (ASTM D2240) of from 65 to 90, (b) a melting point of from 130 to 170° C., (c) a density (ASTM D1505) of from 860 to 875 kg/m³ and (d) a glass transition temperature as measured by DSC of from −25° C. to −35° C.

8 Claims, 11 Drawing Sheets

FIG.3

| Specifications | | Applied voltage: 25 V | Applied Voltage: 100 V |
|---|---|---|---|
| Comparison 1 | 1 | 0.826 Ω | 0.276 Ω |
| | 2 | 1.906 Ω | 0.452 Ω |
| Invention 1 | 1 | ∞ | ∞ |
| | 2 | ∞ | ∞ |
| Invention 2 | 1 | ∞ | ∞ |
| | 2 | ∞ | ∞ |
| Invention 3 | 1 | ∞ | ∞ |
| | 2 | ∞ | ∞ |
| Invention 4 | 1 | ∞ | ∞ |
| | 2 | ∞ | ∞ |

FIG.4

| Specifications | | Applied voltage: 25 V | Applied voltage: 100 V | Applied voltage: 500 V | Applied voltage: 1,000 V |
|---|---|---|---|---|---|
| Comparison 1 | 1 | ∞ | ∞ | 0.022 Ω | - |
| | 2 | ∞ | ∞ | ∞ | 0.036 Ω |
| Invention 1 | 1 | ∞ | ∞ | ∞ | 0.051 Ω |
| | 2 | ∞ | ∞ | ∞ | 0.042 Ω |
| Invention 2 | 1 | ∞ | ∞ | ∞ | ∞ |
| | 2 | ∞ | ∞ | ∞ | ∞ |
| Invention 3 | 1 | ∞ | ∞ | ∞ | ∞ |
| | 2 | ∞ | ∞ | ∞ | ∞ |
| Invention 4 | 1 | ∞ | ∞ | ∞ | ∞ |
| | 2 | ∞ | ∞ | ∞ | ∞ |

| Specifications | | Applied voltage: 25 V | Applied Voltage: 100 V |
|---|---|---|---|
| Comparison 2 | 1 | 0.012 Ω | 0.007 Ω |
| | 2 | 0.009 Ω | 0.009 Ω |
| Invention 5 | 1 | ∞ | ∞ |
| | 2 | ∞ | ∞ |
| Invention 6 | 1 | ∞ | ∞ |
| | 2 | ∞ | ∞ |

FIG.11

| Specifications | | Applied voltage: 25 V | Applied Voltage: 100 V |
|---|---|---|---|
| Invention 16 | 1 | ∞ | ∞ |
| | 2 | ∞ | ∞ |
| Invention 17 | 1 | ∞ | ∞ |
| | 2 | ∞ | ∞ |
| Invention 18 | 1 | ∞ | ∞ |
| | 2 | ∞ | ∞ |
| Invention 19 | 1 | ∞ | ∞ |
| | 2 | ∞ | ∞ |

…

PACKAGING MATERIAL FOR FLAT ELECTROCHEMICAL CELL

CROSS REFERENCES TO RELATED APPLICATIONS

The present application contains subjects related to Japanese Patent Application JP 2007-091287 filed in the Japan Patent Office on Mar. 30, 2007, and Japanese Patent Application JP 2008-077049 filed in the Japan Patent Office on Mar. 25, 2008, the entire contents of which being incorporated herein by reference.

BACKGROUND OF THE INVENTION

1. Field of the Invention

The present invention relates to a packaging material for flat electrochemical cell exhibiting stable sealing properties, insulation properties and moldability.

2. Description of the Related Art

A lithium ion battery is also called a lithium secondary battery and includes one containing an electrolyte in a liquid, gel or high polymer form and having a positive electrode substance and a negative electrode active substance, each of which is made of a high polymer. This lithium ion battery is a battery in which a charge and discharge reaction proceeds in such a manner that at the time of charge, a lithium atom (Li) in a lithium transition metal oxide which is a positive active substance becomes a lithium ion ($Li^+$) and comes into carbon layers of a negative electrode (intercalation), whereas at the time of discharge, the lithium ion ($Li^+$) comes out from the carbon layers (deintercalation), moves into a positive electrode and returns to an original lithium compound. The lithium ion battery has excellent advantages that not only it has a high output voltage and a high energy density as compared with a nickel-cadmium battery and a nickel-hydrogen battery, but it is free from a so-called memory effect that repetition of shallow discharge and recharge lowers an apparent discharge capacity.

Also, the lithium ion battery is configured of a positive electrode collector material/a positive electrode active substance layer/an electrolyte layer/a negative electrode active substance layer/a negative electrode collector material and an exterior body for packaging them. As a packaging material for forming the exterior body, a metallic can obtained by press working of a metal into a container in a cylindrical or rectangular parallelepiped form or the like has hitherto been used.

However, in the metallic can, a container external wall is rigid, and therefore, the shape of a battery itself is limited, and there is no degree of freedom in the shape due to the necessity that the hardware side must be designed in conformity with the battery. Accordingly, in recent years, there is a tendency that a multilayered film is used as the packaging material in place of the metallic can. This packaging material is configured of at least a base material layer, a metal foil and a thermally adhesive resin layer. An exterior body of a pouch type prepared by forming the packaging material in a bag-like state and storing a battery main body therein or an exterior body of an embossing type prepared by press working of the packaging material to form a recess and storing a battery main body in the recess is formed. For example, JP-A-2005-56729 proposes, as a packaging material for battery, a packaging material obtained by successively laminating a non-stretched polypropylene layer having a thickness of more than 10 μm and not more than 60 μm; an acid-modified polypropylene layer for bonding a metal foil and a thermally adhesive resin layer and having a thickness of from 1 to 5 μm; an aluminum foil layer having a thickness of from 10 to 100 μm, on the surface of which is formed a first chemical conversion coating layer having a coating amount of from 5 to 30 mg/m$^2$; and a layer composed of a synthetic resin.

FIG. 12A is a perspective view of a related-art lithium ion battery 1 of a pouch type; and FIG. 12B is a diagrammatic exploded perspective view showing a related-art lithium ion battery of a pouch type. As illustrated in FIGS. 12A and 12B, in the lithium ion battery 1 of a pouch type, a lithium ion battery main body 2 is sealed and contained in an exterior body 10 formed in a bag-like state. Also, FIG. 13A is a perspective view of a related-art lithium ion battery 1 of an embossing type; and FIG. 13B is a diagrammatic exploded perspective view showing a related-art lithium ion battery of an embossing type. As illustrated in FIGS. 13A and 13B, in the lithium ion battery 1 of an embossing type, a lithium ion battery main body 2 is sealed and contained by using an exterior body 10 composed of a tray 10t and a sheet 10s each having an embossing part formed therein.

In all of these types, in sealing the lithium ion battery main body 2 by the exterior body 10, metal terminals 4 which are connected to a positive electrode and a negative electrode of the lithium ion battery main body 2, respectively are protruded to the outside of the exterior body 10, and the metal terminals 4 are sandwiched by the exterior body 10, followed by heat sealing to secure sealing properties. Here, the lithium ion battery main body 2 is configured of a cell (electricity storage part) including a positive electrode composed of a positive electrode active substance and a positive electrode collector body, a negative electrode composed of a negative electrode active substance and a negative electrode collector body and an electrolyte to be filled between the positive electrode and the negative electrode (all of which are not illustrated); and the metal terminals 4 which are communicated with the positive electrode and the negative electrode, respectively in the cell and which are protruded to the outside of the exterior body 10.

Also, in case of actually using the lithium ion battery 1, the impact resistance is weak only by the exterior body 10, and therefore, there is a possibility that a crack is generated due to a small scar. Accordingly, the lithium ion battery 1 is often contained in a plastic case and provided for use.

FIG. 14A is a diagrammatic perspective view showing a related-art lithium ion battery 1; and FIG. 14B is a diagrammatic perspective view showing a related-art lithium ion battery 1 contained in a plastic case 13 as illustrated by a dotted line.

Here, in the case where it is contemplated to miniaturize the lithium ion battery 1, a peripheral sealing part 10b of the exterior body of the lithium ion battery 1 must be folded and contained in the plastic case 13. FIG. 14C is a cross-sectional view of the lithium ion battery 1 contained in the plastic case 13 as seen from a direction shown by an arrow X in FIG. 14B.

However, in a folding part 10c which is a fold of an inner edge of the peripheral sealing part 10b, a thermally adhesive resin layer which is an innermost layer of the exterior body 10 is once melted at the time of heat sealing and then crystallized, and therefore, a crack is liable to be generated at the time of folding. Also, in the case where the generation of such a crack is caused, the electrolyte in the inside of the exterior body 10 comes into contact with a metal foil configuring the exterior body 10, and the metal foil is energized. Therefore, there is a problem that an output of the lithium ion battery is markedly lowered, whereby the function as a battery is lost.

Also, even in en embossing process of the exterior body 10 by means of press working, in the case where a metal with excellent extendibility, for example, aluminum is used as the metal foil configuring the exterior body 10, the stretching of the thermally adhesive resin layer as the innermost layer of the exterior body 10 does not catch up to the elongation of aluminum, resulting in possibilities of separation between aluminum and the thermally adhesive resin layer and generation of a crack in the thermally adhesive resin layer. Also, the packaging material for battery as disclosed in JP-A-2005-56729 did not satisfactorily solve the foregoing problems.

Also, besides the case of containing the lithium ion battery main body 2 in the exterior body 10, when a capacitor or an electric double layer capacitor is contained and sealed, the same problems are caused.

SUMMARY OF THE INVENTION

Then, in view of the foregoing problems, an object of the invention is to provide a packaging material for flat electrochemical cell of an exterior body for sealing and containing therein a flat electrochemical cell of a lithium ion battery main body, a capacitor, an electric double layer capacitor or the like, having excellent flexibility, heat resistance, sealing properties, insulation properties and moldability.

In order to achieve the foregoing object, a first configuration of the invention is concerned with a packaging material for flat electrochemical cell comprising at least a base material layer, a metal foil layer having a chemical conversion treated layer on at least one surface thereof, an acid-modified polyolefin layer and a thermally adhesive resin layer laminated in this order, wherein the acid-modified polyolefin layer is a resin layer constituted of an acid-modified polyolefin based resin, the thermally adhesive resin layer has a resin layer constituted of a propylene based resin, a propylene based elastomer resin is mixed in at least one of the acid-modified polyolefin based resin and the propylene based resin; and the propylene based elastomer resin is a copolymer composed of a constitutional unit derived from propylene and a constitutional unit derived from an α-olefin having from 2 to 20 carbon atoms except propylene; when the total sum of the constitutional unit derived from propylene and the constitutional unit derived from an α-olefin is defined as 100% by mole, contains 50% by mole or more of the constitutional unit derived from propylene; and is satisfied with the following physical properties.

(a) A Shore A hardness (ASTM D2240) is from 65 to 90.
(b) A melting point is from 130 to 170° C.
(c) A density (ASTM D1505) is from 860 to 875 kg/m$^3$.
(d) A glass transition temperature as measured by DSC is from −25° C. to −35° C.

A second configuration of the invention is concerned with the foregoing packaging material for flat electrochemical cell, wherein the propylene based elastomer resin is mixed in an amount of 3% by weight or more and not more than 30% by weight relative to the propylene based resin.

A third configuration of the invention is concerned with the foregoing packaging material for flat electrochemical cell, wherein the metal foil layer is an aluminum foil having a thickness of 80 μm or more and not more than 120 μm.

According to the first configuration of the invention, when the acid-modified polyolefin layer and/or the thermally adhesive resin layer which configures the packaging material for flat electrochemical cell has a resin layer constituted of a resin having a propylene based elastomer resin mixed therein, flexibility, heat resistance and impact resistance of the acid-modified polyolefin layer and/or the thermally adhesive resin are tremendously enhanced. According to this, in the case where this packaging material for flat electrochemical cell is used as an exterior body of a lithium ion battery, even after the thermally adhesive resin layer has been crystallized by means of heat sealing, it keeps certain flexibility and durability. Therefore, at the time of containing in a plastic case, even when an inner edge of a sealing part of the periphery of the exterior body is folded, it is possible to prevent the generation of a crack in the folding part. Accordingly, it is possible to prevent an electrolyte in the inside of the exterior body from contact with the metal foil layer from a cracked portion, thereby securing insulation properties of the exterior body.

Also, since the acid-modified polyolefin layer and/or the thermally adhesive resin layer has certain flexibility and durability, in embossing working of the exterior body by pressing, it is possible to prevent separation between the metal foil layer and the thermally adhesive resin layer and generation of a crack from occurring.

According to the second configuration of the invention, in the packaging material for flat electrochemical cell, when the mixing amount of the propylene based elastomer resin is specified at 3% by weight or more and not more than 30% by weight relative to the propylene based resin, it is possible to stably enhance physical properties of the acid-modified polyolefin layer and/or the thermally adhesive resin layer after heat sealing.

According to the third configuration of the invention, when the exterior body has an aluminum foil having a thickness of 80 μm or more and not more than 120 μm, impact resistance and piercing resistance as an exterior body are enhanced.

In general, by making the thickness of the aluminum foil thick, when a packaging material for flat electrochemical cell is subjected to press working, a strain or wrinkles are liable to be generated between the aluminum foil and the thermally adhesive resin layer. However, when the acid-modified polyolefin layer and/or the thermally adhesive resin is constituted of a propylene resin layer in which a propylene based elastomer resin having excellent durability and flexibility is mixed, these problems can be overcome.

DESCRIPTION OF THE DRAWINGS

FIG. 3 is a table showing insulation properties of a packaging material for electrochemical cell of the invention in Example 1.

FIG. 4 is a table showing insulation properties of a packaging material for electrochemical cell of the invention in Example 2.

FIG. 11 is a table showing insulation properties of a packaging material for electrochemical cell of the invention in Example 8.

DESCRIPTION OF THE PREFERRED EMBODIMENTS

The invention is concerned with a packaging material for electrochemical cell having excellent flexibility, heat resistance, sealing properties, moldability, low-temperature sealing properties and insulation properties. This packaging material is described in detail with reference to the accompanying drawings and the like. The same symbols are given in common portions to those in FIGS. 12A and 12B, 13A and 13B and 14A, 14B and 14C, and explanations thereof are omitted.

Figure 1:
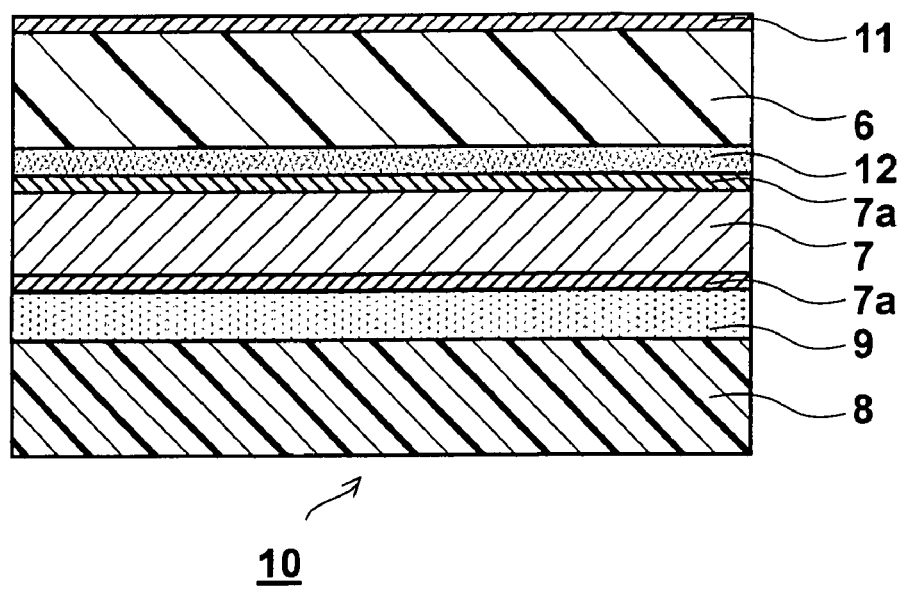
FIG. 1 is a diagrammatic cross-sectional view showing a layer structure of a packaging material for electrochemical cell of the invention.

First of all, materials which constitute each of the layers of the packaging material for electrochemical cell and the like of the invention are described with reference to FIG. 1. As illustrated in FIG. 1, in the packaging material according to the invention which is used for an exterior body 10, a base material layer 6 is disposed as an outermost layer, a thermally adhesive resin layer 8 is disposed as an innermost layer, and a metal foil layer 7 is disposed therebetween, with the thermally adhesive resin layer 8 and the metal foil layer 7 being bonded to each other via an acid-modified polyolefin layer 9. At that time, by providing a chemical conversion treated layer 7a on the surface of the metal foil layer 7, an interlayer adhesive strength between each of the base material layer 6 and the thermally adhesive layer 8 and the metal foil layer 7 becomes more stable. Also, a protective layer 11 is formed on the surface of the base material layer 6. The packaging material for electrochemical cell of the invention may be configured in such a manner that the base material layer 6, the metal foil layer 7 having the chemical conversion treated layer 7a provided therewith, the acid-modified polyolefin layer 9 and the thermally adhesive resin layer 8 are laminated in this order and can also be configured by mediating a different kind of layer between the respective layers.

Here, a lamination method of the metal foil layer 7 and the thermally adhesive resin layer 8 in the packaging material according to the invention can be roughly classified into a dry lamination method and a thermal lamination method. According to the dry lamination method, since the lamination is carried out by using an adhesive, the productivity is excellent. On the other hand, the moisture permeability from the cross section of the adhesive layer is high, and the moisture which has invaded from the cross section permeates into an inner layer and reacts with an electrolytic solution to generate hydrofluoric acid. This hydrofluoric acid generates separation between the metal foil layer 7 and the thermally adhesive resin layer 8 with a lapse of time to cause liquid leakage.

Also, the thermal lamination method includes a method in which a coextruded film composed of the acid-modified polyolefin layer 9 and the thermally adhesive resin layer 8 is laminated on the metal foil layer 7 by a heat lamination method; and a sandwich lamination method in which the melted acid-modified polyolefin layer 9 is sandwiched by the metal foil layer 7 and the thermally adhesive resin 8, followed by lamination. All of these methods are a lamination method which is excellent in resistance to contents and durability as compared with the dry lamination method.

Concretely, the heat lamination method is a heat lamination method in which the surface of the chemical conversion treated layer 7a of the metal foil layer 7 such as aluminum having been subjected to a chemical conversion treatment is stuck on the surface of the acid-modified polyolefin layer 9 in the coextruded film composed of the acid-modified polyolefin layer 9 and the thermally adhesive resin layer 8; and the sandwich lamination method is a method in which the acid-modified polyolefin layer 9 is extruded as an adhesive resin onto the surface of the chemical conversion treated layer 7a of the metal foil layer 7 and bonded to the thermally adhesive resin layer 8. Here, in case of extrusion laminating the acid-modified polyolefin layer 9, by heating the resulting laminate at a temperature of the softening point of the acid-modified polyolefin or higher (post-heating), or by heating the surface of aluminum at a temperature of the softening point of the acid-modified olefin or higher in extrusion working of the acid-modified olefin (preheating), it is possible to realize lamination of a packaging material having an adhesive strength such that it withstands resistance to contents and moldability as an exterior body.

Examples of this heating method include methods of a heat roll contact mode, a hot air mode and a near or far infrared ray mode. In the invention, all of these heating methods are employable, and it would be better that the adhesive resin can be heated at a temperature of its softening point or higher as described previously.

Next, each of the layers of the packaging material configuring the exterior body 10 as illustrated in FIG. 1 is specifically described. The thermally adhesive resin layer 8 as an innermost layer is heat bonded while sandwiching each of the metal terminals 4 of the lithium ion main body 2 (see FIGS. 12A and 12B) in a state that it is protruded to the outside. At that time, the kind of a propylene based resin constituting the thermally adhesive resin layer 8 varies depending upon whether or not an adhesive film for sealing a metal terminal having metal adhesiveness is mediated between the thermally adhesive resin layer and the metal terminal 4. In the case where the adhesive film for sealing a metal terminal is mediated, a film made of a propylene based resin singly or a mixture thereof or the like may be used. In the case where the adhesive film for sealing a metal terminal is not mediated, it is necessary to use a film made of an acid-modified olefin resin having been graft modified with an unsaturated carboxylic acid.

A propylene based resin is favorably used as the thermally adhesive resin layer 8 (the propylene based resin will be often abbreviated simply as "polypropylene" hereinafter). However, films composed of a single layer or multiple layers made of linear low-density polyethylene or medium-density polyethylene, or a single layer or multiple layers made of a blend resin of linear low-density polyethylene and medium-density polyethylene can also be used.

Also, the polypropylene can be classified into various types of, for example, random polypropylene, homo polypropylene and block polypropylene In a multilayered polypropylene film made of polypropylene of such a type, by including a polypropylene film having a propylene based elastomer resin mixed therein during the lamination, it is possible to enhance physical properties of the thermally adhesive resin 8, for example, durability, flexibility and whitening resistance.

The polypropylene having a propylene based elastomer resin mixed therein as referred to herein does not take a structure in which the resins are dispersed in a sea-island state wherein an amorphous area is a sea, whereas a crystal area is an island, as seen in an ethylene-propylene random copolymer, but takes a structure in which "islands" which are a helical crystal area on a level of from 10 nm to 50 nm are communicated with each other to form a network structure, thereby covering the whole of an amorphous area. Because of this "network" structure, the polypropylene having a propylene based elastomer resin mixed therein has excellent sealing strength, durability, heat resistance and flexibility.

According to this, it is possible to increase the molding limits of a packaging material containing polypropylene having a propylene based elastomer resin mixed therein. Also, it is possible to prevent the separation between the metal foil layer 7 and the thermally adhesive resin layer 8 and the generation of a crack in the thermally adhesive resin layer 8 by means of press molding.

This is considered to be caused due to the matter that since the crystal area of polypropylene having a propylene based elastomer resin mixed therein takes a "network" structure, even in once melting and solidification at the time of heat sealing, the "network" structure remains, thereby achieving uniform solidification.

Figure 14A:
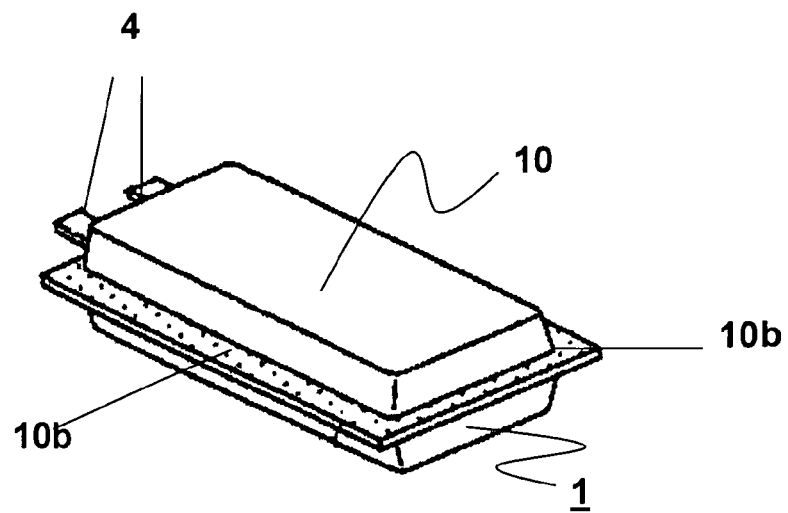
FIG. 14A is a diagrammatic perspective view showing a related-art lithium ion battery.
Figure 14B:
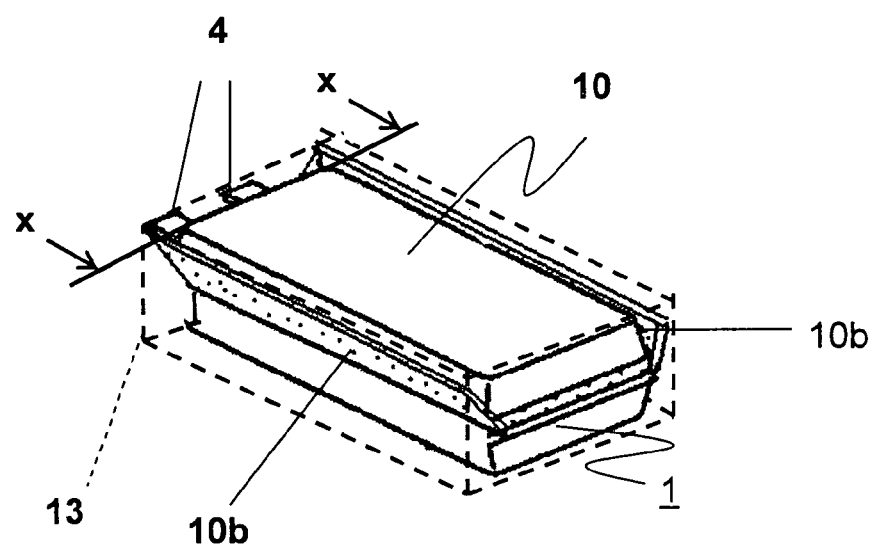
FIG. 14B is a diagrammatic perspective view showing a state that a related-art lithium ion battery is contained in a plastic case.
Figure 14C:
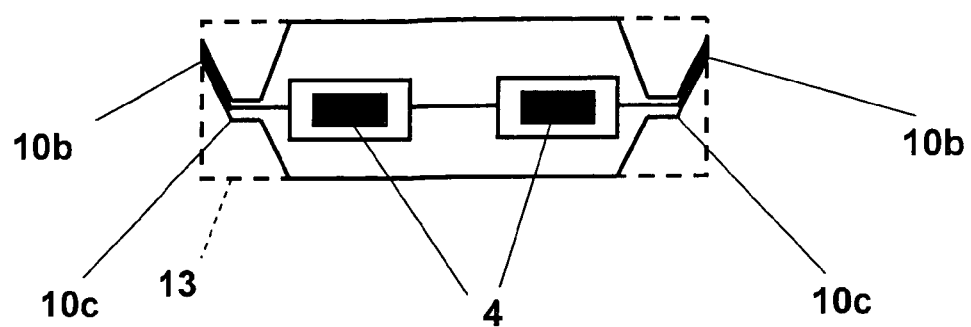
FIG. 14C is a cross-sectional view showing a state that a related-art lithium ion battery is contained in a plastic case.

For that reason, in containing the lithium ion battery 1 in the plastic case 13 as illustrated in FIG. 14B, even in the folding process of the inner edge of the peripheral sealing part 10b of the exterior body, it is possible to prevent the generation of a crack. Also, it is possible to secure insulation properties of the exterior body 10 without causing the contact of the electrolyte in the inside of the exterior body with the metal foil layer 7 from a cracked portion.

Also, it is general that as a degree of crystallization is increased to enhance the heat resistance, the flexibility decreases. However, in the present polypropylene having a propylene based elastomer resin mixed therein, a structure in which the amorphous area is incorporated into the inside of the crystal area on a nano level and is communicated with the amorphous area surrounding the periphery thereof is taken, and therefore, even by enhancing the heat resistance, the flexibility does not decrease.

According to this, in case of heat sealing polypropylene having a propylene based elastomer resin mixed therein, even when the heat sealing is carried out at a temperature lower than the melting point of polypropylene not having a propylene based elastomer resin mixed therein, it is possible to obtain a sufficient sealing strength. For that reason, it is possible to shorten the sealing time, to simplify the heat sealing process and to increase the production efficiency of a lithium ion battery.

When the propylene based elastomer resin is mixed in an amount of 3% by weight or more and not more than 30% by weight relative to the polypropylene, it is possible to most enhance the physical property function of the polypropylene layer.

Here, the propylene based elastomer resin according to the invention is a copolymer composed of a constitutional unit derived from propylene and a constitutional unit derived from an α-olefin having from 2 to 20 carbon atoms (exclusive of propylene); when the total sum of the constitutional unit derived from propylene and the constitutional unit derived from an α-olefin is defined as 100% by mole, contains 50% by mole or more of the constitutional unit derived from propylene; and is satisfied with the following physical properties.

(a) A Shore A hardness (ASTM D2240) is from 65 to 90.
(b) A melting point is from 130 to 170° C.
(c) A density (ASTM D1505) is from 860 to 875 kg/m$^3$.
(d) A glass transition temperature as measured by DSC is from −25° C. to −35° C.

Specific examples of the α-olefin having from 2 to 20 carbon atoms (exclusive of propylene), which constitutes the propylene based elastomer resin according to the invention, include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosen.

Also, the propylene based elastomer resin according to the invention is a copolymer composed of a constitutional unit derived from propylene and a constitutional unit derived from an α-olefin having from 2 to 20 carbon atoms (exclusive of propylene). At that time, the case where the propylene based elastomer resin is a copolymer composed of a constitutional unit derived from propylene, a constitutional unit derived from ethylene and a constitutional unit derived from an α-olefin having from 4 to 10 carbon atoms is more preferable.

Also, when the total sum of the constitutional unit derived from propylene and the constitutional unit derived from an α-olefin having from 2 to 20 carbon atoms (exclusive of propylene) is defined as 100% by mole, the content of the constitutional unit derived from propylene is 50% by mole or more and not more than 99% by mole, and preferably 60% by mole or more and not more than 99% by mole.

Also, the propylene based elastomer resin according to the invention has (a) a Shore A hardness in the range of from 65 to 90, preferably in the range of from 65 to 85, and more preferably in the range of from 72 to 85. The measurement method of the Shore A hardness is described later. Also, the propylene based elastomer resin according to the invention has (b) a melting point in the range of from 130 to 170° C., and preferably in the range of from 130 to 150° C. The measurement method of the melting point is described later. Also, the propylene based elastomer resin according to the invention has (c) a density in the range of from 860 to 875 kg/m$^3$, and preferably from 860 to 872 kg/cm$^3$. The measurement method of the density is described later. Also, the propylene based elastomer resin according to the invention has (d) a glass transition temperature (Tg) as measured by DSC in the range of from −25° C. to −35° C., and preferably in the range of from −26° C. to −33° C. The measurement method of the glass transition temperature (Tg) is described later.

Also, the propylene based elastomer resin according to the invention is preferably one which is satisfied with not only the foregoing requirements (a), (b), (c) and (d) but either one of the following requirements (e) and (f), and more preferably one which is satisfied with not only the foregoing requirements (a), (b), (c) and (d) but both of the following requirements (e) and (f).

(e) A haze (internal haze) is less than 15%, and preferably less than 10%.
(f) A melt flow rate (MFR as measured at 230° C. under a load of 2.16 kg in conformity with ASTM D1238) is in the range of from 3 to 15 g/10 min, and preferably in the range of from 5 to 10 g/10 min.

Next, the measurement methods of the physical properties as shown in the foregoing (a) to (f) are successively described. The Shore A hardness (a) is one determined by allowing a 2 mm-thick press sheet obtained by molding under the following press molding condition to stand at 23° C. for 72 hours, superimposing two sheets thereof, bringing an indenter into contact therewith by using a rubber hardness tester (Shore A type) and immediately thereafter, reading a scale (in conformity with ASTM D2240).

Press Molding Condition

Temperature: 190° C., heating, pressurization time: 7 minutes, cooling at 15° C. by a chiller.

Also, the melting point (Tm) (b) is one determined by filling about 10 mg of a sample in an aluminum pan, (i) raising the temperature to 200° C. at a rate of 100° C./min and keeping at 200° C. for 5 minutes, (ii) dropping the temperature to −150° C. at a rate of 10° C./min, (iii) subsequently raising the temperature to 200° C. at a rate of 10° C./min and measuring a temperature of an endothermic peak observed in (iii).

Also, the density (c) is one determined by allowing a 2 mm-thick press sheet obtained under the same press molding condition as in the sample for measuring the foregoing Shore A hardness to stand at 23° C. for 72 hours and measuring its density by a method in conformity with ASTM D1505.

Also, the glass transition temperature (Tg) (d) is one determined by filling about 10 mg of a sample in an aluminum pan for exclusive use, (i) raising the temperature from 30° C. to 200° C. at a rate of 200° C./min and keeping at 200° C. for 5 minutes, (ii) dropping the temperature from 200° C. to −100° C. at a rate of 10° C./min and keeping at −100° C. for an additional 5 minutes and (iii) subsequently raising the temperature at a rate of 10° C./min. The glass transition temperature (Tg) is determined from a DSC curve during this (iii). DSCRDC 220, manufactured by Seiko Instruments Inc. was used in the Examples.

Also, the haze (internal haze) (e) is one determined by allowing a 2 mm-thick press sheet obtained under the same press molding condition as in the sample for measuring the foregoing Shore A hardness to stand at 23° C. for 72 hours, measuring a diffused transmitted light quantity by a C light source and a total transmitted light quantity by a C light source in a cyclohexanol solution by using a digital turbidimeter (NDH-2000), manufactured by Nippon Denshoku Industries Co., Ltd. and measuring a haze (internal haze) according to the following equation.

Haze(%)=100×(Diffused transmitted light quantity)/ (Total transmitted light quantity)

Also, the melt flow rate (MFR) (f) is one determined by measuring at 230° C. under a load of 2.16 kg in conformity with of ASTM D1238.

The content of each of the constitutional units is one determined by using $^{13}CNMR$.

The propylene based elastomer resin according to the invention is not particularly limited so far as it is satisfied with the foregoing physical properties, and for example, commercially available products may be used. Examples of commercially available products include "NOTIO" (registered trademark), manufactured by Mitsui Chemicals, Inc. However, it should not be construed that the invention is limited thereto.

Also, in addition to the base material layer 6, the metal foil layer 7 and the thermally adhesive resin layer 8, an interlayer made of a biaxially stretched film of a polyimide, polyethylene terephthalate, etc. or the like may be provided between the metal foil layer 7 and the thermally adhesive resin layer 8. The interlayer is able to enhance the strength as a packaging material for electrochemical cell, to improve and stabilize the barrier properties and to prevent a short circuit to be caused due to contact between a tab and the metal foil layer at the time of heat sealing of the exterior body of a lithium ion battery.

Figure 12A:
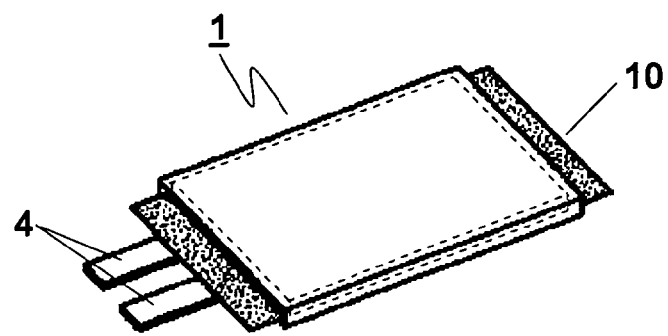
FIG. 12A is a diagrammatic perspective view showing a related-art lithium ion battery of a pouch type.

Also, by using a high-melting type having a melting point of from 140 to 180° C. in the interlayer, for example, in the lithium ion battery 1 as illustrated in FIG. 12A, even in the case where the temperature in the inside of the exterior body 10 raises due to overcharge or the like, the metal terminal 4 generates heat, and the sandwiching portion of the metal terminal 4 in the innermost layer of the exterior body 10 is melted, the interlayer is not melted, whereby it is possible to prevent a short circuit to be caused due to contact between the metal terminal 4 and the metal foil layer 7.

Also, the thermally adhesive resin layer 8 can be formed on the surface of the innermost layer of the exterior body 10 by additional working of a melt extruded polypropylene layer. By the additional working of a melt extruded polypropylene layer, the heat sealing temperature can be dropped while securing a prescribed sealing strength. This is considered to be caused due to the matter that the melt extruded polypropylene layer has a low melting point and high fluidity as compared with other non-melt extruded polypropylene layer configuring the thermally adhesive resin layer 8.

In general, in case of heat sealing a polypropylene layer, it is necessary to apply heat of a temperature in the vicinity of the melting point of the polypropylene layer (about 190° C.) and a pressure to the sealing part. However, by providing a melt extruded polypropylene layer having a melting point of from 120 to 150° C. on the surface of the polypropylene layer, the heat sealing can be achieved at a temperature lower than the melting point of the unstretched polypropylene layer.

Also, at that time, it is known that a sufficient sealing strength can be secured even at the foregoing sealing temperature by using polypropylene having a melt index of 5 g/10 min or more and not more than 30 g/10 min for the melt extruded polypropylene layer.

Figure 12B:
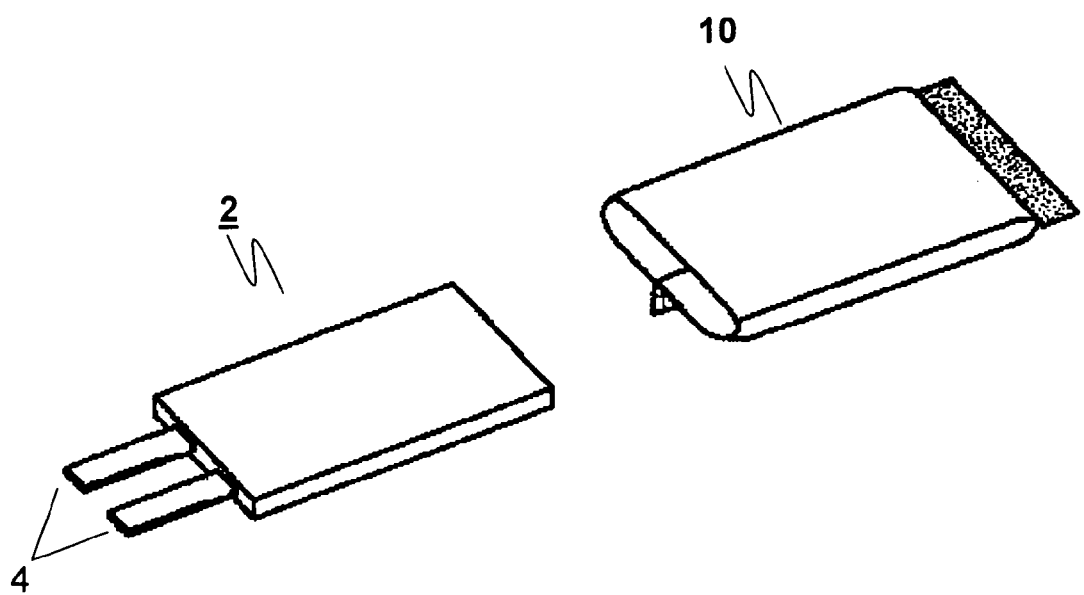
FIG. 12B is a diagrammatic exploded perspective view showing a related-art lithium ion battery of a pouch type.
Figure 13A:
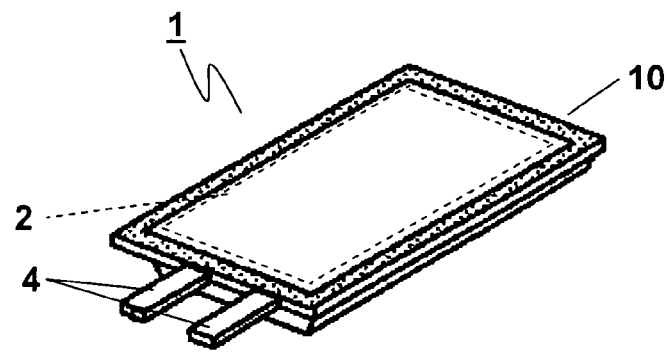
FIG. 13A is a diagrammatic perspective view showing a related-art lithium ion battery of an embossing type.
Figure 13B:
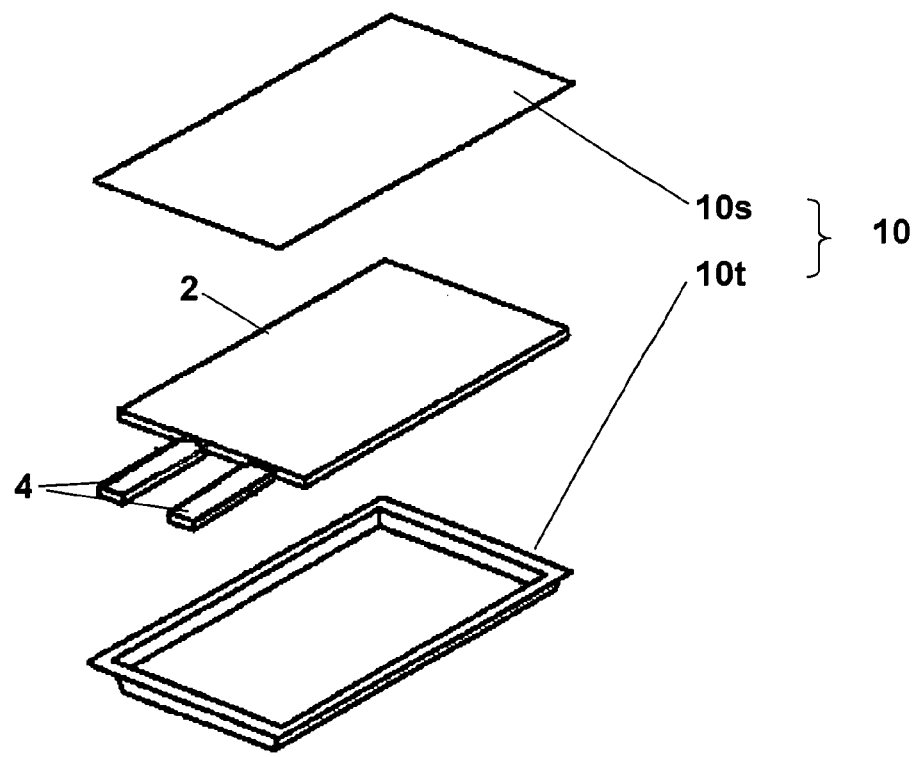
FIG. 13B is a diagrammatic exploded perspective view showing a related-art lithium ion battery of an embossing type.

Also, for example, as illustrated in FIGS. 12A and 12B, in charging the lithium ion battery main body 2 in the exterior body 10, sandwiching the metal terminals 4 of the battery main body in a state that they are extruded to the outside and sealing, an opening of the exterior body 10 is sealed so as to cover the whole of the sandwiching portion of the metal terminals 4 because the fluidity of the melt extruded polypropylene layer is high. For that reason, it is possible to block an external water vapor which penetrates from the sandwiching part of the metal terminals 4 to suppress the formation of hydrofluoric acid due to a reaction between the electrolyte and the water vapor.

Here, by using a resin prepared by mixing the propylene based elastomer resin in the foregoing melt extruded polypropylene layer, it is possible to constitute the thermally adhesive resin layer having characteristics of the polypropylene layer having the propylene based elastomer resin mixed therein while bringing out characteristics of the foregoing melt extruded polypropylene layer.

Also, an ethylene-butene copolymer with low crystallinity, a propylene-butene copolymer with low crystallinity, a terpolymer composed of a three-component copolymer of ethylene, butene and propylene, silica, zeolite, an anti-blocking agent (AB agent) such as acrylic resin beads, a fatty acid amide based slipping agent and the like may be added in the foregoing polypropylene of each type, namely random propylene, homopolypropylene and block polypropylene.

The thermally adhesive resin layer 8 according to the invention is one composed of a single layer made of the foregoing polypropylene of each type or multiple layers of an adequate combination of the foregoing polypropylene layer of each type.

Next, the base material layer 6 is described. The base material layer 6 is generally composed of a stretched polyester or nylon film. At that time, examples of the polyester resin include polyethylene terephthalate, polybutylene terephthalate, polyethylene naphthalate, polybutylene naphthalate, copolyesters and polycarbonates. Also, examples of the nylon include polyamide resins, namely, nylon 6, nylon 6,6, a copolymer of nylon 6 and nylon 6,6, nylon 6,10 and polymetaxylene adipamide (MXD6).

Also, for the purpose of enhancing pinhole resistance and insulation properties when the base material layer 6 is an exterior body of the battery, the base material layer 6 can be composed of a laminate of films having a different material quality in addition to the polyester film or nylon film. In the case where the base material layer 6 is a laminate, the base material layer contains at least one resin layer composed of two or more layers, and each of the layers has a thickness of 6 μm or more, and preferably from 6 to 25 μm. Examples of the laminate for the base material layer are not illustrated but include as follows.

(1) Stretched polyethylene terephthalate/stretched nylon (2) Stretched nylon/stretched polyethylene terephthalate (3) Fluorocarbon based resin/stretched polyethylene terephthalate (the fluorocarbon based resin is a film-like material or is formed by coating in a liquid state and then drying)

(4) Silicone based resin/stretched polyethylene terephthalate (the silicone based resin is a film-like material or is formed by coating in a liquid state and then drying)

(5) Fluorocarbon based resin/stretched polyethylene terephthalate/stretched nylon (6) Silicone based resin/stretched polyethylene terephthalate/stretched nylon (7) Acrylic resin/stretched nylon (the acrylic resin is a film-like material or is formed by coating in a liquid state and then drying for curing)

As shown in (3) to (7), for the purposes of bringing mechanical aptitude of the packaging material (stability of conveyance in a packing machine or a working machine) or surface protection properties (for example, heat resistance and resistance to electrolyte), minimizing frictional resistance between a die and the base material layer 6 at the time of embossing in forming the exterior body 10 for lithium ion battery into an embossing type by means of secondary working, or protecting the base material layer 6 in the case where an electrolytic solution attaches thereto, it is preferable that the base material layer 6 is formed in a multilayered state or that the protective layer 11 (see FIG. 1) such as a fluorocarbon based resin layer, an acrylic resin layer, a silicone based resin layer, a polyester based resin layer and a blended material layer thereof is provided.

Also, in case of using stretched polybutylene terephthalate or polyethylene naphthalate in place of the foregoing stretched polyethylene terephthalate, the same effects are obtainable.

Here, the base material layer 6 is stuck to the metal foil layer 7 via an adhesive layer 12 by employing a dry lamination method.

Next, the metal foil layer 7 is described. The metal foil layer 7 is a layer for preventing the invasion of a water vapor into the inside of the lithium ion battery from the outside. For the purposes of stabilizing a pinhole of a single body of the metal foil layer and working aptitude (pouch forming properties and embossing moldability) and bringing pinhole resistance, examples of the metal foil layer 7 include metals having a thickness of 15 μm or more, such as aluminum and nickel, and films having an inorganic compound (for example, silicon oxide and alumina) vapor deposited thereon. In general, an aluminum foil having a thickness of from 20 to 80 μm was frequently used as the metal foil layer 7.

Here, the thermally adhesive resin layer 8 according to the invention is constituted of polypropylene having a propylene based elastomer resin mixed therein and exhibits excellent physical properties in flexibility and durability. For that reason, even when a folding strain becomes large by regulating the aluminum foil to be used for the metal foil layer 7 so as to have a thickness of 80 μm or more and not more than 120 μm, delamination between the aluminum foil and the thermally adhesive resin layer 8 is hardly generated, or a crack is hardly generated in the thermally adhesive layer 8. Accordingly, in the packaging material for electrochemical cell of the invention, it is possible to enhance the impact resistance and piercing resistance of the exterior body 10 by using an aluminum foil having a thickness of 80 μm or more and not more than 120 μm for the metal foil layer 7.

Also, besides the strain to be caused due to the thickness of this aluminum foil, it takes a lot of time for the radiation of heat held in the aluminum foil at the time of heat sealing in proportion to the thickness of the aluminum foil, and crystallization of the thermally adhesive resin layer 8 proceeds. As a result, there is a possibility that a crack is generated at the time of folding the sealing part.

However, when the thermally adhesive resin layer 8 is constituted of polypropylene having a propylene based elastomer resin mixed therein, it has excellent heat resistance as compared with other polypropylene based resin, and therefore, the generation of such a crack can be prevented.

Also, in the case where the generation of a pinhole is improved, and the type of the exterior body of the lithium ion battery is of an embossing type, in order to make it free from the generation of a crack or the like in embossing molding, it is desirable that aluminum to be used as the metal foil layer 7 has a material quality having an iron content of from 0.3 to 9.0% by weight, and preferably from 0.7 to 2.0% by weight.

According to this, in comparison with iron-free aluminum, the ductility of aluminum is good, the generation of a pinhole due to folding as an exterior body is low, and when the packaging material is subjected to embossing molding, a side wall can be easily formed. When the iron content is less than 0.3% by weight, effects such as prevention of the generation of a pinhole and improvement of embossing moldability are not found. On the other hand, when the iron content of aluminum exceeds 9.0% by weight, the flexibility as aluminum is hindered, whereby bag-forming properties as a packaging material are deteriorated.

In aluminum to be manufactured by cold rolling, its flexibility, nerve and hardness vary depending upon an annealing (so-called annealing treatment) condition. As aluminum to be used in the invention, aluminum obtained by slightly or completely annealing, which tends to be soft, is more desirable than hard-treated materials which are free from annealing.

That is, the annealing condition may be properly chosen in conformity with the working aptitude (pouch forming properties and embossing moldability). For example, in order to prevent the generation of wrinkles or a pinhole at the time of embossing molding, soft aluminum which has been annealed corresponding to a degree of molding can be used.

Also, by providing the chemical conversion treated layer 7a on the front and back surfaces of aluminum as the metal foil layer 7, an adhesive strength to the acid-modified polyolefin layer 9 and the adhesive layer 12 is enhanced.

Next, this chemical conversion treated layer 7a is described. As illustrated in FIG. 1, the chemical conversion treated layer 7a is formed at least on the surface of the metal foil layer 7 on the side of the thermally adhesive resin layer 8. The chemical conversion treated layer 7a is able to stably bond the acid-modified polyolefin layer 9 and the metal foil layer 7 each other, thereby preventing delamination between the metal foil layer 7 and the thermally adhesive resin layer 8. Also, the chemical conversion treated layer 7a also works to prevent corrosion of aluminum.

Concretely, by forming an acid-resistant coating made of a phosphate, a chromate, a fluoride, a triazine thiol compound or the like, it is possible to prevent delamination between the metal foil layer 7 and the thermally adhesive resin layer 8 at the time of embossing molding and dissolution and corrosion of the aluminum surface to be caused due to hydrogen fluoride formed by a reaction between an electrolyte of the lithium ion battery and water, especially dissolution and corrosion of aluminum oxide existing on the aluminum surface and to enhance adhesiveness (wetting properties) of the aluminum surface.

The chemical conversion treated layer 7a is formed on the surface of the metal foil layer 7 by a chromium based chemical conversion treatment such as a chromic acid-chromate treatment, a phosphoric acid-chromate treatment and a coating type chromate treatment, a non-chromium based (coating type) chemical conversion treatment with zirconium, titanium, zinc phosphate, etc. or the like. In view of the matters that strong bonding to a fluorocarbon based resin can be achieved and that a continuous treatment is possible, and a water-washing process is not necessary, thereby rendering the treatment costs cheap, a coating type chemical conversion treatment, especially a treatment with a treatment liquid containing an aminophenol polymer, a trivalent chromium compound or a phosphorus compound is the most preferable.

Also, as to a method of forming the chemical conversion treated layer 7a, the treatment liquid may be molded by choosing a coating method such as a bar coating method, a roll coating method, a gravure coating method and an immersion method. Also, in view of the matter that the function of the chemical conversion treated layer 7a is revealed at a maximum and kept over a long period of time, it is preferable to previously treat the surface of the metal foil layer prior to the formation of the chemical conversion treated layer 7a by a known degreasing treatment method such as an alkali immersion method, an electrolytic rinsing method, an acid rinsing method and an acid activation method.

Also, for the purposes of properly enhancing and stabilizing fabrication properties, lamination working aptitude and aptitude to secondary working of a final product (pouch forming properties and embossing moldability), each of the foregoing layers may be properly subjected to a surface activation treatment such a corona treatment, a blast treatment, an oxidation treatment and an ozone treatment.

Next, the acid-modified polyolefin layer 9 is described. The acid-modified polyolefin layer 9 is a layer to be provided for bonding the metal foil layer 7 and the thermally adhesive resin layer 8 as an inner layer of the exterior body 10 each other and is required to be properly chosen and used depending upon the kind of the resin to be used for the thermally adhesive resin layer 8. In general, an acid-modified polyolefin resin can be used. Specific examples thereof include polyolefin resins having been graft modified with an unsaturated carboxylic acid, copolymers of ethylene or propylene and acrylic acid or methacrylic acid and metal-crosslinked polyolefin resins. If desired, a butene component, an ethylene-propylene-butene copolymer, an amorphous ethylene-propylene copolymer, a propylene-α-olefin copolymer or the like may be added in an amount of 5% or more.

Also, by using acid-modified polypropylene for the acid-modified polyolefin layer 9, it is possible to provide the exterior body 10 with more excellent resistance to contents and adhesive strength.

In case of using acid-modified polypropylene, for example, (1) a homo type having a Vicat softening point of 115° C. or higher and a melting point of 150° C. or higher, (2) a copolymer of ethylene and propylene having a Vicat softening point of 105° C. or higher and a melting point of 130° C. or higher (random copolymerization type) and (3) an unsaturated carboxylic acid-modified single body having a melting point of 110° C. or higher or a blend thereof can be used.

Here, by adding a resin containing a propylene based elastomer resin, the acid-modified polypropylene brings not only an effect for strengthening the adhesive strength of the thermally adhesive resin layer 8 but an effect for preventing delamination between the metal foil layer 7 and the thermally adhesive resin layer 8. Also, it also serves functions to more enhance the flexibility and durability of the whole of the exterior body 10, to enhance folding resistance and to prevent the generation of a crack at the time of molding.

It should not be construed that the invention is limited to the foregoing respective embodiments, and various changes and modifications can be made. Embodiments obtained by properly combining different embodiments with a technical measure disclosed in each of them are also included in the technical scope of the invention.

Example 1

The actions and advantages of the invention are hereunder specifically described with reference to the following Examples. Example 1 is concerned with the evaluation on insulation properties in a sealing part after heat sealing in the case where a propylene based elastomer resin is mixed in a polypropylene layer configuring a thermally adhesive resin layer.

The propylene based elastomer resin to be used in the present Example is NOTIO (registered trademark) PN-2070, manufactured by Mitsui Chemicals, Inc. This propylene based elastomer resin has the content of a propylene-derived constitutional unit of 71% by mole and contains an ethylene-derived constitutional unit and a 1-butene-derived constitutional unit as constitutional units other than the propylene-derived constitutional unit. Also, the propylene based elastomer resin has physical properties of a Shore A hardness (ASTM D2240) of 75, a melting point of 138° C., a density (ASTM D1505) of 867 kg/m$^3$, a glass transition temperature (Tg) of −29° C., a haze of 7% and a melt flow rate (MFR, ASTM D1238) of 7.0 g/10 min.

Next, a manufacturing method of a packaging material for electrochemical cell to be used in the present Example is described. First of all, the both surfaces of aluminum were subjected to a chemical conversion treatment, and a stretched nylon film was stuck on one of the chemical conversion treated surfaces via a two-pack curing type polyurethane based adhesive by a dry lamination method. Next, acid-modified polypropylene (hereinafter abbreviated as "acid-modified PP") was coated on the other chemical conversion treated surface by a roll coating method and baked, and a three-layer coextruded film having a block polypropylene film (hereinafter abbreviated as "block PP") (thickness: 20 μm) sandwiched between two layers of a random polypropylene film (hereinafter abbreviated as "random PP") (thickness: 5 μm) was laminated on the surface of acid-modified PP by a heat lamination method, thereby obtaining a packaging material for electrochemical cell of Comparison 1.

In the present Example, stretched nylon film (thickness: 25 µm) and aluminum (thickness: 40 µm) were used as a base material layer and a metal foil layer, respectively; and a treatment liquid composed of a phenol resin, a chromium fluoride compound and phosphoric acid was coated on a chemical conversion treated layer by a roll coating method and baked under a condition that the coating temperature was 90° C. or higher. Here, the coating amount of chromium was 10 mg/m$^2$ (on a dry weight basis); the acid-modified PP was baked under a condition that the aluminum temperature was 140° C. or higher; and the coating amount of the acid-modified PP was 3 g/m$^2$ (on a dry weight basis).

Next, a packaging material for electrochemical cell according to Invention 1 was obtained in the same manner as in the lamination method of the packaging material obtained in the foregoing Comparison 1, except for using a block PP film having 10% by weight of a propylene based elastomer resin (NOTIO (registered trademark) PN-2070, manufactured by Mitsui Chemicals, Inc.) mixed therein in place of the block PP film configuring the three-layer coextruded film.

Next, a packaging material for electrochemical cell according to Invention 2 was obtained in the same manner as in the lamination method of the packaging material obtained in the foregoing Comparison 1, except for using a block PP film having 20% by weight of a propylene based elastomer resin (NOTIO (registered trademark) PN-2070, manufactured by Mitsui Chemicals, Inc.) mixed therein in place of the block PP film configuring the three-layer coextruded film.

Next, a packaging material for electrochemical cell according to Invention 3 was obtained in the same manner as in the lamination method of the packaging material obtained in the foregoing Comparison 1, except for using a block PP film having 20% by weight of a propylene based elastomer resin (NOTIO (registered trademark) PN-2070, manufactured by Mitsui Chemicals, Inc.) mixed therein in place of the block PP film configuring the three-layer coextruded film and using a random PP film having 10% by weight of a propylene based elastomer resin (NOTIO (registered trademark) PN-2070, manufactured by Mitsui Chemicals, Inc.) mixed therein in place of the two layers of random PP.

Next, a packaging material for electrochemical cell according to Invention 4 was obtained in the same manner as in the lamination method of the packaging material obtained in the foregoing Comparison 1, except for using a block PP film having 20% by weight of a propylene based elastomer resin (NOTIO (registered trademark) PN-2070, manufactured by Mitsui Chemicals, Inc.) mixed therein in place of the block PP film configuring the three-layer coextruded film and using a random PP film having 20% by weight of a propylene based elastomer resin (NOTIO (registered trademark) PN-2070, manufactured by Mitsui Chemicals, Inc.) mixed therein in place of the two layers of random PP.

Next, each of the packaging materials for electrochemical cell of the foregoing Comparison 1 and Inventions 1 to 4 was cut into a sheet piece of 60 mm (MD direction)×60 mm (TD direction), this sheet piece was folded double in the MD direction, and opposing two sides were heat sealed in a width of 7 mm to prepare an exterior body of a pouch type having an opening on one side thereof. At that time, the heat sealing was carried out under a condition at a surface pressure of 1.0 MPa and a sealing temperature of 190° C. for a sealing time of 3.0 seconds.

Figure 2:
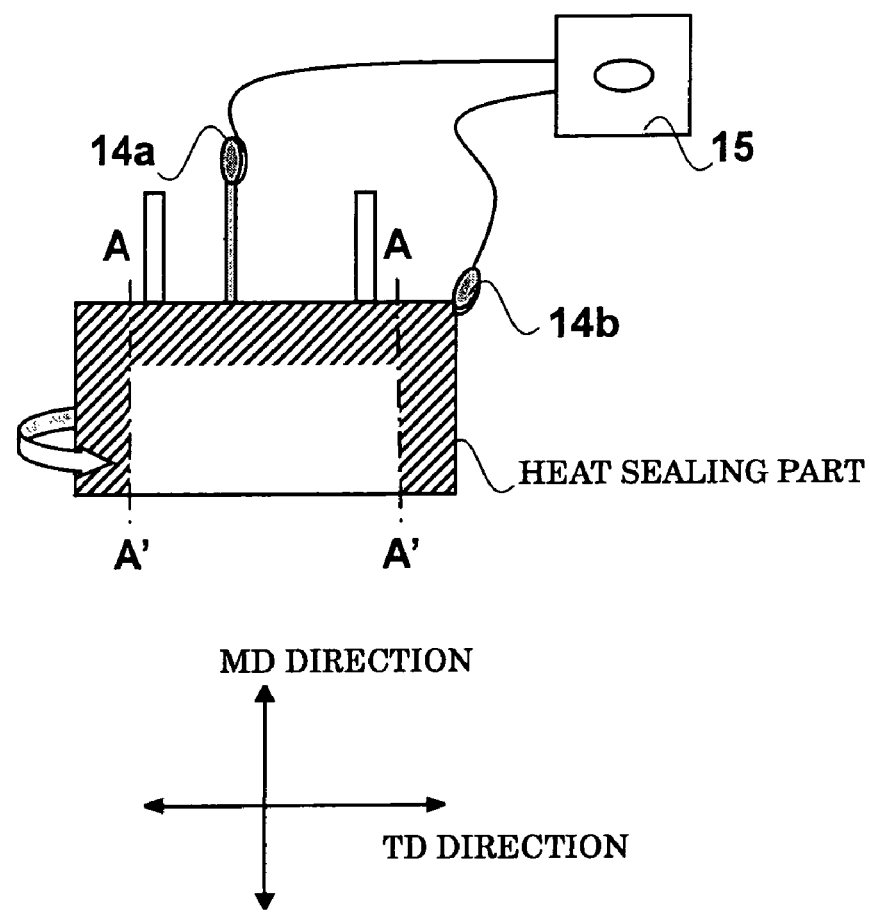
FIG. 2 is a diagrammatic plan view of a lithium ion battery for explaining an evaluation method in the Examples of the invention.

FIG. 2 is a diagrammatic plan view for explaining an evaluation method in the present Example. As to an evaluation method of insulation properties in the folding part of the exterior body after heat sealing, when the case of folding back at 90 degrees such that a fold is formed on A-A' on the heat sealing part of the prepared exterior body (see FIG. 2) is defined as MD-direction folding; after reciprocally repeating this MD-direction folding 20 times, a lithium ion battery main body was charged from the opening of the exterior body; and an electrolytic solution was filled, followed by sealing.

Next, as illustrated in FIG. 2, in the electrolytic solution having a positive terminal 14a charged therein, a negative terminal 14b was set such that a tip thereof reached an aluminum foil of the exterior body, and a voltage of 25 V or 100 V was applied for 5 seconds by a voltmeter 15, thereby measuring a resistance value. In this evaluation method, each four of the samples of Comparison 1 and Inventions 1 to 4 were prepared and evaluated twice at an applied voltage of 25 V or 100 V. The results obtained are given in a table of FIG. 3.

As is clear from the table of FIG. 3, when a fold was put in the MD direction as an orientation direction of the heat sealing resin, in all of the cases of the thermally adhesive resin layer containing a polypropylene layer having a propylene based elastomer resin (NOTIO (registered trademark) PN-2070, manufactured by Mitsui Chemicals, Inc.) mixed therein, the resistance value was "∞", and a crack was not generated at all. On the other hand, in the thermally adhesive resin layer not containing a polypropylene layer having a propylene based elastomer resin (NOTIO (registered trademark) PN-2070, manufactured by Mitsui Chemicals, Inc.) mixed therein, a crack was generated, and it was noted that the aluminum foil is energized.

It was noted from this matter that in the folding process of an inner edge of the peripheral sealing part, by containing a polypropylene layer having a propylene based elastomer resin (NOTIO (registered trademark) PN-2070, manufactured by Mitsui Chemicals, Inc.) mixed therein in the thermally adhesive resin layer, the generation of a crack could be suppressed, thereby securing insulation properties of the exterior body.

Example 2

Example 2 is concerned with the evaluation on limited moldability in the case where a propylene based elastomer resin is mixed in a polypropylene layer configuring a thermally adhesive resin layer.

First of all, packaging materials for electrochemical cell the same as those in Comparison 1 and Inventions 1 to 4 as obtained in Example 1 were prepared and cut into a size of 80×120 mm in square. Next, each of the samples was molded into an exterior body of an embossing type on one surface having a depth of 7.0 mm by using a molding die (female mold) having an aperture of 30 mm×50 mm and a corresponding molding die (male mold). A lithium ion battery main body was charged in the exterior body after molding, and an electrolytic solution was filled, followed by sealing in a sealing width of 5 mm.

Next, a positive terminal was charged in the electrolytic solution, a negative terminal was set such that a tip thereof reached an aluminum foil of the exterior body, and a voltage of 25 V, 100 V, 500 V or 1,000 V was applied for 5 seconds by a voltmeter, thereby measuring a resistance value. In this evaluation method, each eight of the samples of Comparison 1 and Inventions 1 to 4 were prepared and evaluated twice at each applied voltage. The results obtained are given in a table of FIG. 4.

As is clear from the table of FIG. 4, when a high voltage of 500 V was applied, energization was confirmed only in Comparison 1; and when a high voltage of 1,000 V was applied, energization was confirmed only in the packaging materials for electrochemical cell according to Comparison 1 and Invention 1. It was noted from this matter that the case of mixing a propylene based elastomer resin (NOTIO (registered trademark) PN-2070, manufactured by Mitsui Chemicals, Inc.) was more excellent in insulation properties after embossing molding than the case of not mixing the same; and that the case of mixing 20% by weight of a propylene based elastomer resin (NOTIO (registered trademark) PN-2070, manufactured by Mitsui Chemicals, Inc.) was more excellent in insulation properties after embossing molding than the case of mixing 10% by weight of the same. Accordingly, it was noted that by mixing a propylene based elastomer resin (NOTIO (registered trademark) PN-2070, manufactured by Mitsui Chemicals, Inc.), the flexibility and durability of the thermally adhesive resin are enhanced, thereby suppressing the generation of a crack.

Example 3

Example 3 is concerned with the evaluation on sealing strength in the case where a propylene based elastomer resin is mixed in a polypropylene layer configuring a thermally adhesive resin layer.

First of all, packaging materials for electrochemical cell the same as those in Comparison 1 and Inventions 1 to 4 as obtained in Example 1 were each prepared and cut into a sheet piece of 60 mm (MD direction)×60 mm (TD direction). Next, this sheet piece was folded double in the TD direction, and opposing two sides were heat sealed in a width of 7 mm to prepare an exterior body of a pouch type having an opening on one side thereof. The opening was heat sealed in a width of 7 mm at a surface pressure of 1.0 MPa for a sealing time of 3.0 seconds. At that time, by changing the sealing temperature to 150° C., 170° C., 190° C. and 210° C., respectively, samples were prepared.

Next, the heat sealing part in the foregoing opening of each of these samples was cut off into a thin rectangle having a width of 15 mm, which was then drawn at a rate of 300 mm/min by using a tensile tester (AGS-50D (trade name), manufactured by Shimadzu Corporation), thereby measuring its heat sealing strength. The unit is N/15 mm-width.

Figures 5, 6:
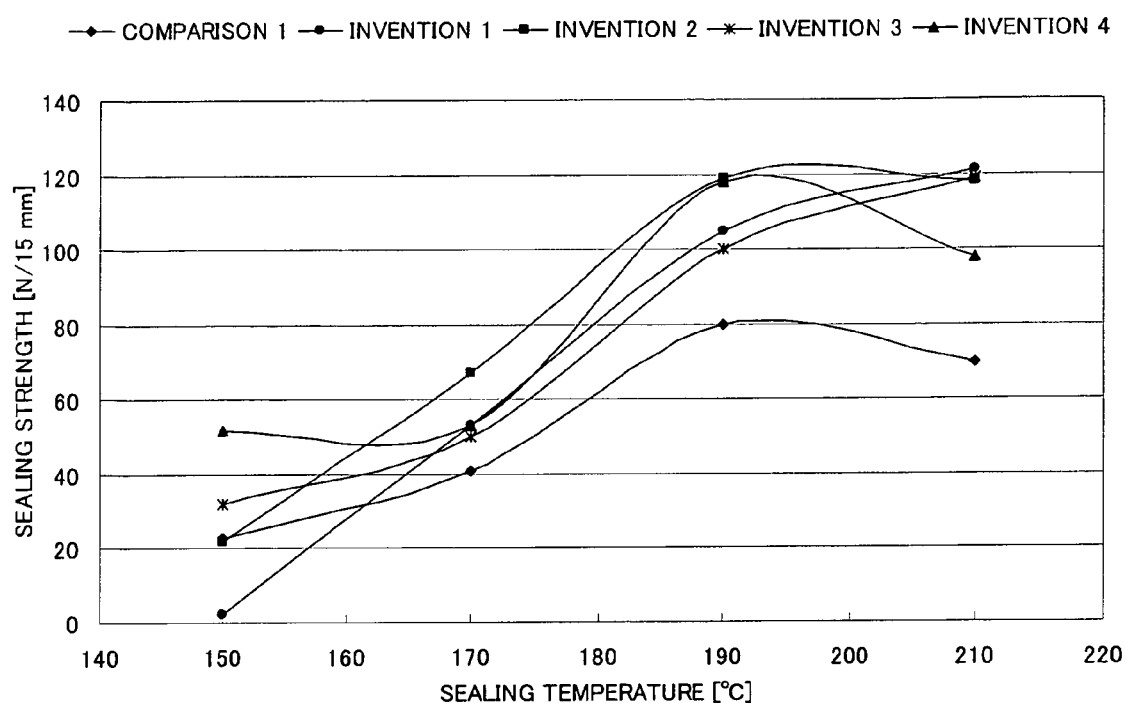
FIG. 5 is a graph showing a sealing strength of a packaging material for electrochemical cell of the invention in Example 3.
FIG. 6 is a table showing insulation properties of a packaging material for electrochemical cell of the invention in Example 4.

The relationship between the sealing temperature and the sealing strength as measured with respect to the foregoing packaging materials for electrochemical cell of Comparison 1 and Inventions 1 to 4 is shown in a graph of FIG. 5. As is clear from this graph, it was noted that the thermally adhesive resin according to Invention 2 strengthens the sealing strength at the sealing temperature of from 150° C. to 200° C. as compared with the thermally adhesive resins according to Comparison 1 and Invention 1. Also, it was noted that the thermally adhesive resin according to Invention 4 similarly strengthens the sealing strength at the sealing temperature of from 150° C. to 200° C. as compared with the thermally adhesive resin according to Invention 3. Accordingly, it was noted that by increasing the mixing amount of a propylene based elastomer resin (NOTIO (registered trademark) PN-2070, manufactured by Mitsui Chemicals, Inc.), the sealing strength of the block PP film and the random PP film increase. Also, in particular, it was noted that in case of mixing a propylene based elastomer resin in a block PP film, the amount of change of the sealing strength is large.

Accordingly, though in general, a strength of about 80 N/15 mm is necessary upon application with heat in the vicinity of 190° C. as a heat sealing temperature, by using the packaging material for electrochemical cell of Invention 1, a strength of about 80 N/15 mm is obtainable by heat in the vicinity of 175° C. Accordingly, the low-temperature sealing properties can be secured, and the manufacturing efficiency of a lithium ion battery can be enhanced.

Example 4

Example 4 is concerned with the evaluation on insulation properties in a sealing part after heat sealing in the case where a metal foil layer is provided thick, and a propylene based elastomer resin is mixed in a polypropylene layer configuring a thermally adhesive resin layer.

First of all, packaging materials for electrochemical cell prepared by using aluminum having a thickness of 100 μm for the metal foil layer in the packaging materials for electrochemical cell of Comparison 1 and Inventions 1 and 2 in Example 1 are designated as Comparison 2, Invention 5 and Invention 6, respectively. Each of the packaging materials for electrochemical cell was cut into a sheet piece of 60 mm (MD direction)×60 mm (TD direction). Next, this sheet piece was folded double in the MD direction, and opposing two sides were heat sealed in a width of 7 mm to prepare an exterior body of a pouch type having an opening on one side thereof. At that time, the heat sealing was carried out under a condition at a surface pressure of 1.0 MPa and a sealing temperature of 190° C. for a sealing time of 3.0 seconds.

Next, when the case of folding back at 90 degrees such that a fold is formed on A-A' on the heat sealing part of the prepared exterior body (see FIG. 2) was defined as MD-direction folding. After reciprocally repeating this MD-direction folding 5 times, a lithium ion battery main body was charged from the opening of the exterior body, and an electrolytic solution was filled, followed by sealing.

Next, as illustrated in FIG. 2, in the electrolytic solution having a positive terminal 14a charged therein, a negative terminal 14b was set such that a tip thereof reached an aluminum foil of the exterior body, and a voltage of 25 V or 100 V was applied for 5 seconds by a voltmeter 15, thereby measuring a resistance value. In this evaluation method, each four of the samples of Comparison 2, Invention 5 and Invention 6 were prepared and evaluated twice with respect to the MD-direction folding at an applied voltage of 25 V or 100 V. The results obtained are given in a table of FIG. 6.

As is clear from the table of FIG. 6, it was noted that in the case where a fold is put in the MD direction as an orientation direction of the heat sealing resin, even when the thickness of aluminum as the base material layer is 100 μm, the generation of a crack can be suppressed by mixing a propylene based elastomer resin (NOTIO (registered trademark) PN-2070, manufactured by Mitsui Chemicals, Inc.) in the block PP.

Accordingly, when the aluminum foil of the exterior body is thick, it takes a lot of time for the radiation of heat held in the aluminum foil at the time of heat sealing, and crystallization of the thermally adhesive resin proceeds, resulting in a possibility of the generation of a crack at the time of folding of the sealing part. However, when the thermally adhesive resin layer is configured of block PP having a propylene based elastomer resin mixed therein, the generation of a crack can be suppressed.

Example 5

Example 5 is concerned with the evaluation on sealing strength in the case where a propylene based elastomer resin is mixed in an acid-modified polypropylene layer.

First of all, the both surfaces of an aluminum foil (thickness: 40 μm) were subjected to a chemical conversion treatment; a stretched nylon film (thickness: 100 μm) was stuck on one of the chemical conversion treated surfaces via a two-pack curing type polyurethane based adhesive by a dry lamination method; and acid-modified PP (thickness: 15 μm) was melt extruded onto the other chemical conversion treated surface, and a film for sealant composed of a three-layer coextruded film having an ethylene-propylene block copolymer film (thickness: 20 μm) sandwiched between two layers of an ethylene-propylene random copolymer film (thickness: 5 μm) was laminated on the surface of acid-modified PP by a heat lamination method. The thus obtained packaging material for electrochemical cell was designated as Comparison 3.

Also, a packaging material for electrochemical cell obtained by performing the lamination in the same manner as in the packaging material for electrochemical cell as obtained in Comparison 3, except for replacing the acid-modified PP with acid-modified PP having 10% by weight of a propylene based elastomer resin (NOTIO (registered trademark) PN-2070, manufactured by Mitsui Chemicals, Inc.) mixed therein was designated as Invention 7. Also, a packaging material for electrochemical cell obtained by performing the lamination in the same manner as in the packaging material for electrochemical cell as obtained in Comparison 3, except for replacing the acid-modified PP with acid-modified PP having 20% by weight of a propylene based elastomer resin (NOTIO (registered trademark) PN-2070, manufactured by Mitsui Chemicals, Inc.) mixed therein was designated as Invention 8.

At that time, in all of the cases, the chemical conversion treatment was carried out in such a manner that an aqueous solution composed of a phenol resin, a chromium fluoride compound and phosphoric acid was coated as a treatment liquid by a roll coating method and baked under a condition that the coating temperature was 180° C. or higher. Also, the coating amount of chromium was 10 mg/m$^2$ (on a dry weight basis). The acid-modified PP was coated by a roll coating method and baked under a condition that the aluminum temperature was 180° C. or higher. The coating amount of the acid-modified PP was 3 g/m$^2$ (on a dry weight basis).

Next, each of the packaging materials for electrochemical cell of the foregoing Comparison 3 and Inventions 7 and 8 was cut into a sheet piece of 60 mm (MD direction)×60 mm (TD direction), this sheet piece was folded double in the TD direction, and opposing two sides were heat sealed in a width of 7 mm to prepare an exterior body of a pouch type having an opening on one side thereof. The opening of the exterior body was heat sealed in a width of 7 mm at a surface pressure of 1.0 MPa for a sealing time of 3.0 seconds. At that time, a sample obtained by performing sealing while changing the sealing temperature to 150° C., 170° C., 190° C. and 210° C., respectively was prepared for each of the foregoing laminates.

Next, the heat sealing part in the foregoing opening of each of these samples was cut off into a thin rectangle having a width of 15 mm, which was then drawn at a rate of 300 mm/min by using a tensile tester (AGS-50D (trade name), manufactured by Shimadzu Corporation), thereby measuring its heat sealing strength. The unit is N/15 mm-width.

Figure 7:
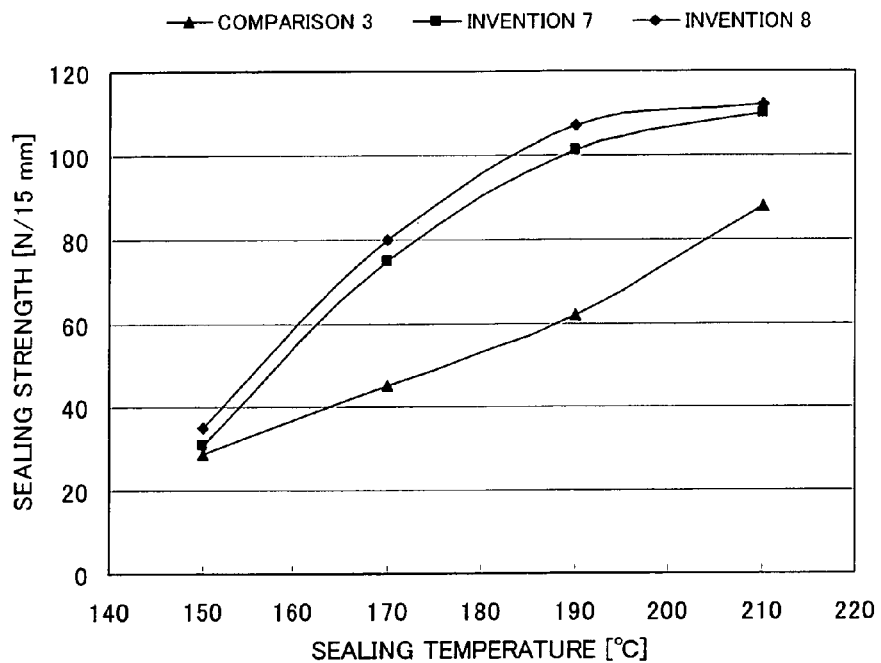
FIG. 7 is a graph showing a sealing strength of a packaging material for electrochemical cell of the invention in Example 5.

The relationship between the sealing temperature and the sealing strength as measured with respect to the foregoing packaging materials for electrochemical cell of Comparison 3 and Inventions 7 and 8 is shown in a graph of FIG. 7. Since the sealing strength is enhanced in the order of Invention 8, Invention 7 and Comparison 3, it is noted that as the mixing amount of the propylene based elastomer resin (NOTIO (registered trademark) PN-2070, manufactured by Mitsui Chemicals, Inc.) in the acid-modified PP is increased, the sealing strength of the thermally adhesive resin layer increases.

Example 6

Example 6 is concerned with the evaluation on sealing strength in the case where a propylene based elastomer resin is mixed in a melt extruded polypropylene layer configuring an acid-modified polypropylene layer and a thermally adhesive resin layer.

The both surfaces of an aluminum foil (thickness: 100 μm) were subjected to a chemical conversion treatment; a stretched nylon film (thickness: 25 μm) was stuck on one of the chemical conversion treated surfaces via a two-pack curing type polyurethane based adhesive by a dry lamination method; and acid-modified PP (thickness: 15 μm) having 20% by weight of a propylene based elastomer (NOTIO (registered trademark) PN-2070, manufactured by Mitsui Chemicals, Inc.) mixed in acid-modified PP was melt extruded onto the other chemical conversion treated surface; and random PP was also melt extruded in a thickness of 30 μm, thereby obtaining a laminate according to Invention 9.

At that time, the chemical conversion treatment was carried out in such a manner that an aqueous solution composed of a phenol resin, a chromium fluoride compound and phosphoric acid was coated as a treatment liquid by a roll coating method and baked under a condition that the coating temperature was 180° C. or higher. Also, the coating amount of chromium was 10 mg/m$^2$ (on a dry weight basis). The acid-modified PP was coated by a roll coating method and baked under a condition that the aluminum temperature was 180° C. or higher. The coating amount of the acid-modified PP was 3 g/m$^2$ (on a dry weight basis).

Next, a laminate obtained in the same lamination method as in Invention 9, except for replacing the foregoing random PP with random PP having 20% by weight of a propylene based elastomer (NOTIO (registered trademark) PN-2070, manufactured by Mitsui Chemicals, Inc.) mixed in a polypropylene resin and melt extruding it in a thickness of 30 μm was designated as Invention 10; a laminate obtained in the same lamination method as in Invention 9, except for replacing the foregoing random PP with homo PP and melt extruding it in a thickness of 30 μm was designated as Invention 11; and a laminate obtained in the same lamination method as in Invention 9, except for replacing the foregoing random PP with homo PP having 20% by weight of a propylene based elastomer (NOTIO (registered trademark) PN-2070, manufactured by Mitsui Chemicals, Inc.) mixed in a polypropylene resin and melt extruding it in a thickness 30 μm was designated as Invention 12.

Also, a laminate obtained in the same lamination method as in Invention 9, except for replacing the foregoing random PP with homo PP having 20% by weight of a propylene based elastomer (NOTIO (registered trademark) PN-2070, manufactured by Mitsui Chemicals, Inc.) mixed in a polypropylene resin and random PP having 20% by weight of a propylene based elastomer (NOTIO (registered trademark) PN-2070, manufactured by Mitsui Chemicals, Inc.) mixed in a polypropylene resin and melt extruding them in a thickness of 30 μm was designated as Invention 13.

Next, each of the laminates of the foregoing Inventions 9 and 13 was cut into a sheet piece of 60 mm (MD direction)×60 mm (TD direction), this sheet piece was folded double in the TD direction, and opposing two sides were heat sealed in a width of 7 mm to prepare an exterior body of a pouch type having an opening on one side thereof. The opening of the exterior body was heat sealed in a width of 7 mm at a surface pressure of 1.0 MPa for a sealing time of 3.0 seconds. At that time, a sample obtained by performing sealing while changing the sealing temperature to 150° C., 170° C., 190° C. and 210° C., respectively was prepared for each of the foregoing laminates.

Next, the heat sealing part in the foregoing opening of each of these samples was cut off into a thin rectangle having a width of 15 mm, which was then drawn at a rate of 300 mm/min by using a tensile tester (AGS-50D (trade name), manufactured by Shimadzu Corporation), thereby measuring its heat sealing strength. The unit is N/15 mm-width.

Figure 8:
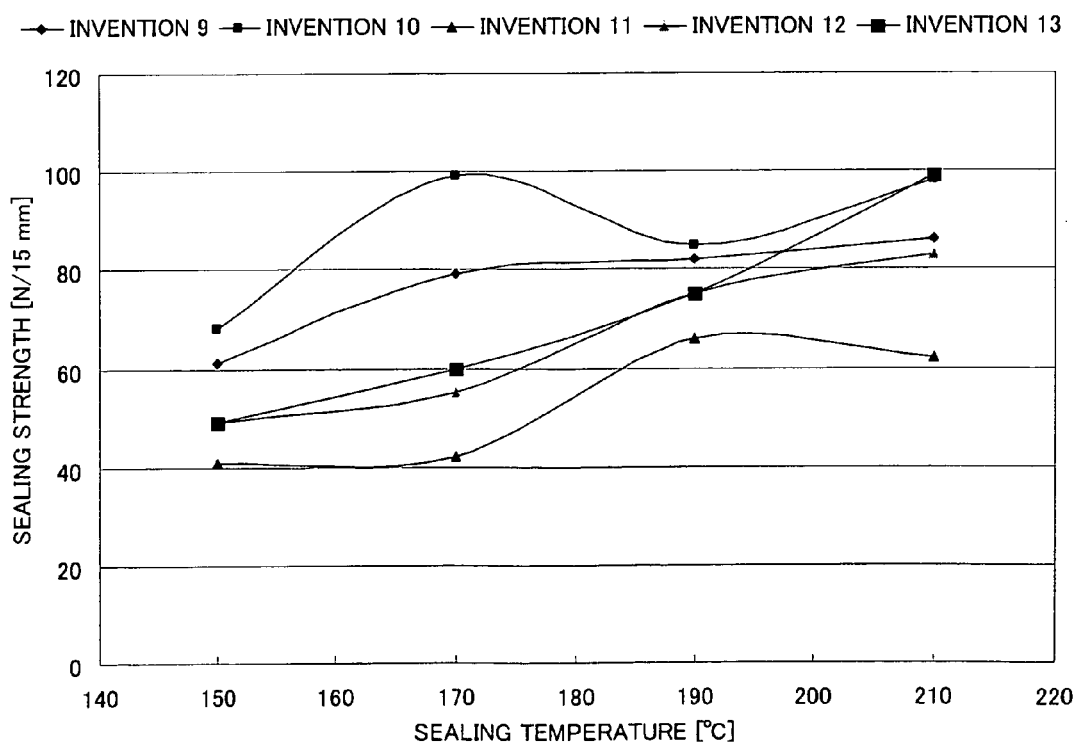
FIG. 8 is a graph showing a sealing strength of a packaging material for electrochemical cell of the invention in Example 6.

The relationship between the sealing temperature and the sealing strength as measured with respect to the foregoing packaging materials for electrochemical cell of Inventions 9 to 13 is shown in a graph of FIG. 8. As is clear from this graph, it was noted that by mixing the propylene based elastomer resin (NOTIO (registered trademark) PN-2070, manufactured by Mitsui Chemicals, Inc.) in the acid-modified PP, the random PP and the homo PP, the sealing strength of the laminate increases at all of the sealing temperatures.

Example 7

Example 7 is concerned with the evaluation on sealing strength and lamination strength in the case where a propylene based elastomer resin is mixed in acid-modified PP.

The both surfaces of an aluminum foil (thickness: 40 µm) were subjected to a chemical conversion treatment; a stretched nylon film (thickness: 25 µm) was stuck on one of the chemical conversion treated surfaces via a two-pack curing type polyurethane based adhesive by a dry lamination method; and acid-modified PP (thickness: 15 µm) was melt extruded onto the other chemical conversion treated surface; and a film for sealant composed of an unstretched polypropylene film (thickness: 30 µm) was also laminated by a thermal lamination method, thereby obtaining a laminate of Comparison 4.

A laminate obtained in the same method as in the laminate as obtained in Comparison 4, except for replacing the foregoing acid-modified PP with acid-modified PP having 10% by weight of a propylene based elastomer (NOTIO (registered trademark) PN-2070, manufactured by Mitsui Chemicals, Inc.) mixed therein was designated as Invention 14; and a laminate obtained in the same method as in the laminate as obtained in Comparison 4, except for replacing the foregoing acid-modified PP with acid-modified PP having 20% by weight of a propylene based elastomer (NOTIO (registered trademark) PN-2070, manufactured by Mitsui Chemicals, Inc.) mixed therein was designated as Invention 15.

At that time, in all of the cases, the chemical conversion treatment was carried out in such a manner that an aqueous solution composed of a phenol resin, a chromium fluoride compound and phosphoric acid was coated as a treatment liquid by a roll coating method and baked under a condition that the coating temperature was 180° C. or higher. Also, the coating amount of chromium was 10 mg/m$^2$ (on a dry weight basis). The acid-modified polypropylene (hereinafter abbreviated as "acid-modified PP") was coated by a roll coating method and baked under a condition that the aluminum temperature was 180° C. or higher. The coating amount of the acid-modified PP was 3 g/m$^2$ (on a dry weight basis).

Next, each of the laminates of the foregoing Comparison 4 and Inventions 14 and 15 was cut into a sheet piece of 60 mm (MD direction)×60 mm (TD direction), this sheet piece was folded double in the TD direction, and opposing two sides were heat sealed in a width of 7 mm to prepare an exterior body of a pouch type having an opening on one side thereof. The opening of the exterior body was heat sealed in a width of 7 mm at a surface pressure of 1.0 MPa for a sealing time of 3.0 seconds. At that time, a sample obtained by performing sealing at the sealing temperature at 190° C. was prepared for each of the foregoing laminates.

Next, the heat sealing part in the foregoing opening of each of these samples was cut off into a thin rectangle having a width of 15 mm, which was then drawn at a rate of 300 mm/min by using a tensile tester (AGS-50D (trade name), manufactured by Shimadzu Corporation), thereby measuring its heat sealing strength. The unit is N/15 mm-width.

Figure 9:
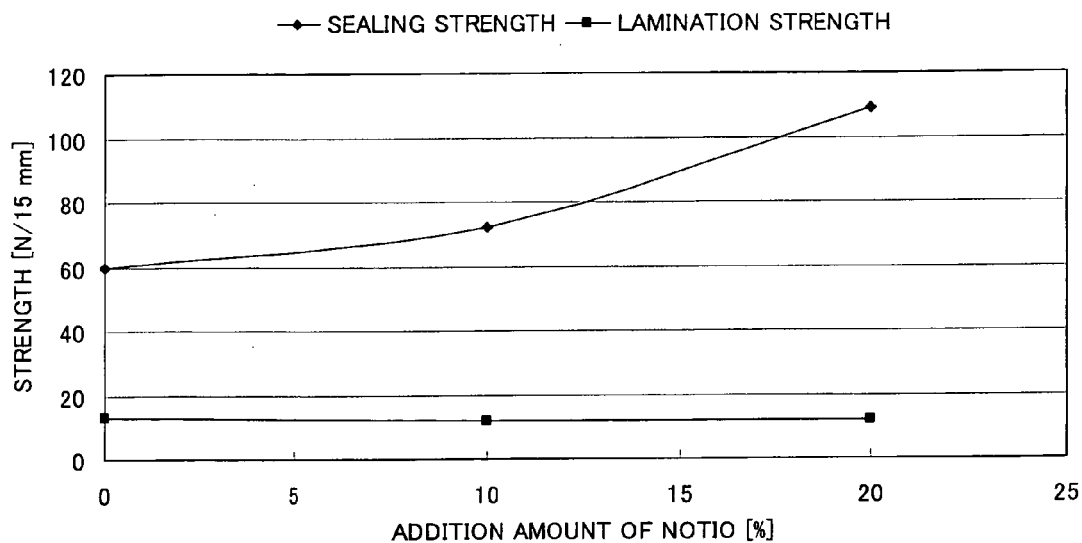
FIG. 9 is a graph showing a sealing strength and a lamination strength of a packaging material for electrochemical cell of the invention in Example 7.

The relationship between the addition amount of the propylene based elastomer resin and the sealing strength as measured with respect to the foregoing packaging materials for electrochemical cell of Comparison 4 and Inventions 14 and 15 is shown in a graph of FIG. 9. As is clear from this graph, it was noted that the sealing strength increases in proportion to the amount of the propylene based elastomer resin (NOTIO (registered trademark) PN-2070, manufactured by Mitsui Chemicals, Inc.) to be added in the acid-modified PP.

Next, each of the laminates of the foregoing Comparison 4 and Inventions 14 and 15 was cut into a sheet piece of 60 mm (MD direction)×60 mm (TD direction), this sheet piece was folded double in the TD direction, and opposing two sides were heat sealed in a width of 7 mm to prepare a bag having an opening on one side thereof. The opening was heat sealed in a width of 7 mm at a surface pressure of 1.0 MPa for a sealing time of 3.0 seconds under the same condition as described above. Next, both of the heat sealed laminates were peeled away to measure a lamination strength, the results of which are shown in a graph of FIG. 9. As is clear from this graph, it was noted that the lamination strength is not influenced by the addition amount of the propylene based elastomer (NOTIO (registered trademark) PN-2070, manufactured by Mitsui Chemicals, Inc.).

Figure 10:
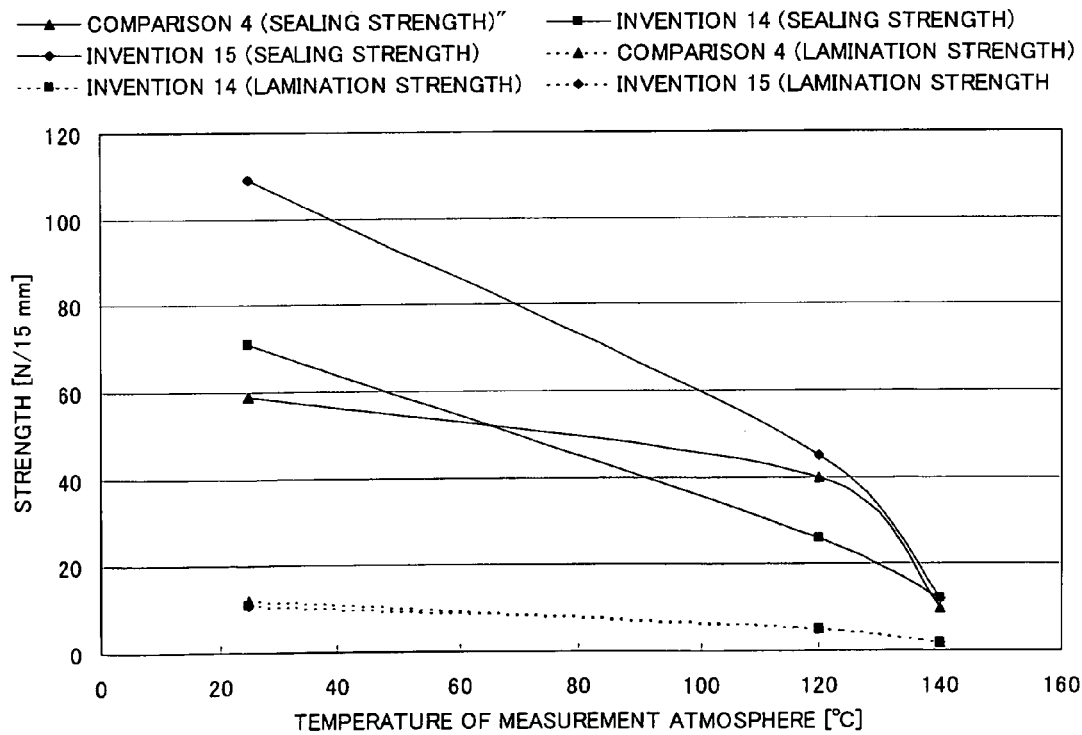
FIG. 10 is a graph showing a sealing strength and a lamination strength of a packaging material for electrochemical cell of the invention in Example 7.

Also, with respect to the foregoing laminates of Comparison 4 and Inventions 14 and 15, the sealing temperature and lamination strength were measured in the same method as the foregoing method by changing the temperature of a measurement atmosphere to 25° C., 120° C. and 140° C., respectively, the results of which are shown in a graph of FIG. 10. As is clear from this graph, it was noted that the laminate obtained by using the acid-modified PP having 20% by weight of a propylene based elastomer (NOTIO (registered trademark) PN-2070, manufactured by Mitsui Chemicals, Inc.) mixed therein keeps a stable sealing strength against the change of the atmospheric temperature.

Example 8

Example 8 is concerned with the evaluation on insulation properties in a sealing part after heat sealing in the case where a propylene based elastomer resin is mixed in a polypropylene layer configuring a thermally adhesive resin layer.

The propylene based elastomer resin to be used in the present Example is NOTIO (registered trademark) PN-2060, manufactured by Mitsui Chemicals, Inc. This propylene based elastomer resin has the content of a propylene-derived constitutional unit of 79% by mole and contains an ethylene-derived constitutional unit and a 1-butene-derived constitutional unit as constitutional units other than the propylene-derived constitutional unit. Also, the propylene based elastomer resin has physical properties of a Shore A hardness (ASTM D2240) of 82, a melting point of 155° C., a density (ASTM D1505) of 868 kg/m$^3$, a glass transition temperature (Tg) of −28° C., a haze of 4% and a melt flow rate (MFR, ASTM D1238) of 6.0 g/10 min.

Next, a manufacturing method of a packaging material for electrochemical cell to be used in the present Example is described. First of all, the both surfaces of aluminum are subjected to a chemical conversion treatment, and a stretched nylon film is stuck on one of the chemical conversion treated surfaces via a two-pack curing type polyurethane based adhesive by a dry lamination method. Next, acid-modified PP is coated on the other chemical conversion treated surface by a roll coating method and baked, and a three-layer coextruded film having block PP (thickness: 20 μm) sandwiched between two layers of random PP (thickness: 5 μm) is laminated on the surface of acid-modified PP by a heat lamination method, thereby obtaining a packaging material for electrochemical cell.

In the present Example, stretched nylon film (thickness: 25 μm) and aluminum (thickness: 40 μm) are used as a base material layer and a metal foil layer, respectively; and a treatment liquid composed of a phenol resin, a chromium fluoride compound and phosphoric acid is coated on a chemical conversion treated layer by a roll coating method and baked under a condition that the coating temperature is 90° C. or higher. Here, the coating amount of chromium is 10 mg/m$^2$ (on a dry weight basis); the acid-modified PP is baked under a condition that the aluminum temperature is 140° C. or higher; and the coating amount of the acid-modified PP is 3 g/m$^2$ (on a dry weight basis).

Next, a packaging material for electrochemical cell according to Invention 16 was obtained in the same manner as in the lamination method of the foregoing packaging material, except for using a block PP film having 10% by weight of a propylene based elastomer resin (NOTIO (registered trademark) PN-2060, manufactured by Mitsui Chemicals, Inc.) mixed therein in place of the block PP film configuring the three-layer coextruded film.

Next, a packaging material for electrochemical cell according to Invention 17 was obtained in the same manner as in the lamination method of the foregoing packaging material, except for using a block PP film having 20% by weight of a propylene based elastomer resin (NOTIO (registered trademark) PN-2060, manufactured by Mitsui Chemicals, Inc.) mixed therein in place of the block PP film configuring the three-layer coextruded film.

Next, a packaging material for electrochemical cell according to Invention 18 was obtained in the same manner as in the lamination method of the foregoing packaging material, except for using a block PP film having 20% by weight of a propylene based elastomer resin (NOTIO (registered trademark) PN-2060, manufactured by Mitsui Chemicals, Inc.) mixed therein in place of the block PP film configuring the three-layer coextruded film and using a random PP film having 10% by weight of a propylene based elastomer resin (NOTIO (registered trademark) PN-2060, manufactured by Mitsui Chemicals, Inc.) mixed therein in place of the two layers of random PP.

Next, a packaging material for electrochemical cell according to Invention 19 was obtained in the same manner as in the lamination method of the foregoing packaging material, except for using a block PP film having 20% by weight of a propylene based elastomer resin (NOTIO (registered trademark) PN-2060, manufactured by Mitsui Chemicals, Inc.) mixed therein in place of the block PP film configuring the three-layer coextruded film and using a random PP film having 20% by weight of a propylene based elastomer resin (NOTIO (registered trademark) PN-2060, manufactured by Mitsui Chemicals, Inc.) mixed therein in place of the two layers of random PP.

Next, each of the packaging materials for electrochemical cell of the foregoing Inventions 16 to 19 was cut into a sheet piece of 60 mm (MD direction)×60 mm (TD direction), this sheet piece was folded double in the MD direction, and opposing two sides were heat sealed in a width of 7 mm to prepare an exterior body of a pouch type having an opening on one side thereof. At that time, the heat sealing was carried out under a condition at a surface pressure of 1.0 MPa and a sealing temperature of 190° C. for a sealing time of 3.0 seconds.

FIG. 2 is a diagrammatic plan view for explaining an evaluation method in the present Example. As to an evaluation method of insulation properties in the folding part of the exterior body after heat sealing, when the case of folding back at 90 degrees such that a fold is formed on A-A' on the heat sealing part of the prepared exterior body (see FIG. 2) is defined as MD-direction folding, after reciprocally repeating this MD-direction folding 20 times, a lithium ion battery main body was charged from the opening of the exterior body, and an electrolytic solution was filled, followed by sealing.

Next, as illustrated in FIG. 2, in the electrolytic solution having a positive terminal 14a charged therein, a negative terminal 14b was set such that a tip thereof reached an aluminum foil of the exterior body, and a voltage of 25 V or 100 V was applied for 5 seconds by a voltmeter 15, thereby measuring a resistance value. In this evaluation method, each four of the samples of Inventions 16 to 19 were prepared and evaluated twice at an applied voltage of 25 V or 100 V. The results obtained are given in a table of FIG. 11.

As is clear from the table of FIG. 11, when a fold was put in the MD direction as an orientation direction of the heat sealing resin, in all of the cases of the thermally adhesive resin layer containing a polypropylene layer having a propylene based elastomer resin (NOTIO (registered trademark) PN-2060, manufactured by Mitsui Chemicals, Inc.) mixed therein, the resistance value was "∞", and cracking was not generated at all.

It was noted from this matter that in the folding process of an inner edge of the peripheral sealing part, by containing a polypropylene layer having a propylene based elastomer resin (NOTIO (registered trademark) PN-2060, manufactured by Mitsui Chemicals, Inc.) mixed therein in the thermally adhesive resin layer, the generation of a crack could be suppressed, thereby securing insulation properties of the exterior body.

It was confirmed from the foregoing Examples that by mixing a propylene based elastomer resin (NOTIO (registered trademark) PN-2070 or PN-2060, manufactured by Mitsui Chemicals, Inc.), the physical properties of the acid-modified polyolefin layer and the thermally adhesive resin are enhanced.

What is claimed is:

1. A packaging material for a flat electrochemical cell comprising at least a base material layer, a metal foil layer having a chemical conversion treated layer on at least one surface thereof, an acid-modified polyolefin layer and a thermally adhesive resin layer laminated in this order, wherein
the acid-modified polyolefin layer is a resin layer constituted of an acid-modified polyolefin based resin, the thermally adhesive resin layer has a resin layer constituted of a propylene based resin,
a propylene based elastomer resin is mixed in at least one of the acid-modified polyolefin based resin and the propylene based resin, the propylene based elastomer resin has a network structure in which islands constituting a crystal area are communication with each other, thereby covering a whole of an amorphous area; and the propylene based elastomer resin is a copolymer composed of a constitutional unit derived from propylene and a constitutional unit derived from an α-olefin having from 2 to 20 carbon atoms except propylene; when the total sum of the constitutional unit derived from propylene and the constitutional unit derived from an α-olefin is defined as 100% by mole, contains 50% by mole or more of the constitutional unit derived from propylene; and is satisfied with the following physical properties:

(a) a Shore A hardness (ASTM D2240) is in the range of from 65 to 90, (b) a melting point is in the range of from 130° C. to 170° C., (c) a density (ASTM D1505) is in the range of from 860 to 875 kg/m$^3$, and (d) a glass transition temperature as measured by DSC is in the range of from −25° C. to −35° C.

2. The packaging material for a flat electrochemical cell according to claim 1, wherein the propylene based elastomer resin is mixed in an amount of 3% by weight or more and not more than 30% by weight relative to the propylene based resin.

3. The packaging material for a flat electrochemical cell according to claim 1, wherein the metal foil layer is an aluminum foil having a thickness of 80 μm or more and not more than 120 μm.

4. The packaging material for a flat electrochemical cell according to claim 2, wherein the metal foil layer is an aluminum foil having a thickness of 80 μm or more and not more than 120 μm.

5. The packaging material for a flat electrochemical cell according to claim 1, wherein the propylene based elastomer resin has a melting point in the range of from 130° C. to 150° C.

6. The packaging material for a flat electrochemical cell according to claim 1, wherein the propylene based elastomer resin has a density in the range of 860 kg/cm$^3$ to 872 kg/cm$^3$.

7. The packaging material for a flat electrochemical cell according to claim 1, wherein the propylene based elastomer resin satisfies at least one of (e) a haze (internal haze) of less than 15%, and (f) a melt flow rate (MFR as measured at 230° C. under a load of 2.16 kg in conformity with ASTM D1238) in the range of 3 to 15 g/10 min.

8. The packaging material for a flat electrochemical cell according to claim 1, wherein in (e) the haze is less than 10%, and in (f) the melt flow rate is in the range of 5 to 10 g/10 min.

* * * * *